US010064217B2

(12) United States Patent
Rajagopal et al.

(10) Patent No.: US 10,064,217 B2
(45) Date of Patent: Aug. 28, 2018

(54) METHOD AND APPARATUS FOR ENABLING FLEXIBLE NUMEROLOGY IN MULTI-USER MIMO SYSTEM

(71) Applicant: Samsung Electronics Co., Ltd, Suwon-si (KR)

(72) Inventors: Sridhar Rajagopal, Plano, TX (US); Jianzhong Zhang, Plano, TX (US); Young-Han Nam, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 25 days.

(21) Appl. No.: 15/284,492

(22) Filed: Oct. 3, 2016

(65) Prior Publication Data

US 2017/0111930 A1   Apr. 20, 2017

Related U.S. Application Data

(60) Provisional application No. 62/350,496, filed on Jun. 15, 2016, provisional application No. 62/265,372, filed on Dec. 9, 2015, provisional application No. 62/242,765, filed on Oct. 16, 2015.

(51) Int. Cl.
    H04W 74/00    (2009.01)
    H04B 7/06     (2006.01)
    H04H 20/38    (2008.01)
    H04L 27/26    (2006.01)
    H04B 7/0452   (2017.01)
    H04W 88/02    (2009.01)
    H04W 88/08    (2009.01)

(52) U.S. Cl.
    CPC ........ H04W 74/006 (2013.01); H04B 7/0626 (2013.01); H04H 20/38 (2013.01); H04L 27/265 (2013.01); H04B 7/0452 (2013.01); H04W 88/02 (2013.01); H04W 88/08 (2013.01)

(58) Field of Classification Search
    CPC combination set(s) only.
    See application file for complete search history.

(56) References Cited

U.S. PATENT DOCUMENTS 9,332,449 B2 *   5/2016  Park .............. H04W 24/08
2007/0223423 A1  9/2007  Kim et al.
2009/0034438 A1  2/2009  Soulie et al.
    (Continued)

FOREIGN PATENT DOCUMENTS

CN   105721113 A   * 6/2016   ........... H04B 7/0417
KR   1020080110839 A   12/2008

OTHER PUBLICATIONS

International Search Report dated Jan. 24, 2017 in connection with International Application No. PCT/KR2016/011640, 3 pages.
    (Continued)

Primary Examiner — Junpeng Chen

(57) ABSTRACT

A method of base station (BS) in a wireless communication system. the method comprises identifying a set of transmission parameters comprising a numerology, wherein the numerology includes a subcarrier spacing, determining a plurality of baseband signal generation chains each of which includes the set of transmission parameters comprising different numerology, and transmitting, at least one user equipment (UE), downlink signals comprising the set of transmission parameters using a multi-user multi-input multi-output (MU-MIMO).

18 Claims, 21 Drawing Sheets

(56) References Cited

U.S. PATENT DOCUMENTS

| | | | |
|---|---|---|---|
| 2013/0039349 A1 | 2/2013 | Ebrahimi Tazeh Mahalleh et al. | |
| 2014/0301240 A1* | 10/2014 | Park | H04B 7/0643 370/253 |
| 2015/0171983 A1 | 6/2015 | Kusashima | |
| 2015/0215148 A1 | 7/2015 | Taori et al. | |
| 2015/0256308 A1 | 9/2015 | Ma et al. | |
| 2015/0282129 A1* | 10/2015 | Takeda | H04L 1/0046 370/329 |
| 2015/0282178 A1 | 10/2015 | Kim et al. | |
| 2015/0304994 A1* | 10/2015 | Kim | H04L 5/0048 370/280 |
| 2016/0254889 A1* | 9/2016 | Shattil | H04L 5/0035 370/329 |

OTHER PUBLICATIONS

Frank Schaich, et al. "Subcarrier spacing—a neglected degree of freedom?"—2015 IEEE 16th International Workshop on Signal Processing Advances in Wireless Communications (SPAWC)Alcatel-Lucent AG, Bell Labs Stuttgart, Germany—Apr. 15, 2015 IEEE—5 Pages.

* cited by examiner

METHOD AND APPARATUS FOR ENABLING FLEXIBLE NUMEROLOGY IN MULTI-USER MIMO SYSTEM

CROSS-REFERENCE TO RELATED APPLICATIONS AND CLAIM OF PRIORITY

The present application claims priority to U.S. Provisional Patent Application Ser. No. 62/242,765, filed on Oct. 16, 2015, entitled "Method and Apparatus for Enabling UE-Specific Sub-Carrier Spacing in Multi-User MIMO Systems;" U.S. Provisional Patent Application Ser. No. 62/265,372, filed on Dec. 9, 2015, entitled "Method and Apparatus for Enabling Flexible Numerology in Multi-User MIMO Systems;" and U.S. Provisional Patent Application Ser. No. 62/350,496, filed on Jun. 15, 2016, entitled "Method and Apparatus for Enabling Flexible Numerology in Multi-User MIMO Systems." The content of the above-identified patent documents are incorporated herein by reference.

TECHNICAL FIELD

The present application relates generally to multi-user MIMO systems in wireless communication systems. More specifically, this disclosure relates to an enabling flexible numerology in multi-user MIMO system.

BACKGROUND $5^{th}$ generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of $10^6$ devices/km², a network energy efficiency improvement of 100× and an area traffic capacity of 10 Mb/s/m². While all the requirements need not be met simultaneously, the design of 5G networks should provide flexibility to support various applications meeting part of the above requirements on a use case basis.

SUMMARY

The present disclosure relates to a pre-$5^{th}$-Generation (5G) or 5G communication system to be provided for supporting higher data rates beyond $4^{th}$-Generation (4G) communication system such as long term evolution (LTE). Embodiments of the present disclosure provide an enabling flexible numerology in multi-user MIMO systems.

In one embodiment, a user equipment (UE) in a wireless communication system is provided. The UE includes a transceiver configure to receive, from a base station (BS), downlink signals comprising at least one available set of transmission parameters using a multi-user multi-input multi-output (MU-MIMO). The UE further includes at least one processor configured to determine at least one preferred set of transmission parameters including a subcarriers spacing based on the received downlink signals, wherein the transceiver is further configured to transmit a report message including the at least one preferred set of transmission parameters.

In another embodiment, a base station (BS) in a wireless communication system is provided. The BS includes at least one processor configured to identify a set of transmission parameters comprising a numerology, wherein the numerology includes a subcarrier spacing, and determine a plurality of baseband signal generation chains each of which includes the set of transmission parameters comprising different numerology. The BS further includes a transceiver configured to transmit, to at least one user equipment (UE), downlink signals comprising the set of transmission parameters using a multi-user multi-input multi-output (MU-MIMO).

In yet another embodiment, a method of base station (BS) in a wireless communication system is provided. The method includes identifying a set of transmission parameters comprising a numerology, wherein the numerology includes a subcarrier spacing, determining a plurality of baseband signal generation chains each of which includes the set of transmission parameters comprising different numerology, and transmitting, at least one user equipment (UE), downlink signals comprising the set of transmission parameters using a multi-user multi-input multi-output (MU-MIMO).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: Huawei Technologies, US20150256308A1, "Systems and Methods for OFDM with Flexible Sub-carrier Spacing and Symbol duration;" and Schaich, F. and Wild, T., "Subcarrier spacing—a neglected degree of freedom?" IEEE 16th international workshop on Signal Processing Advances in Wireless Communications (SPAWC), pp. 56-60, June 2015.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access(NOMA), and sparse code multiple access (SCMA) as an advanced access technology have been developed.

Figure 1:
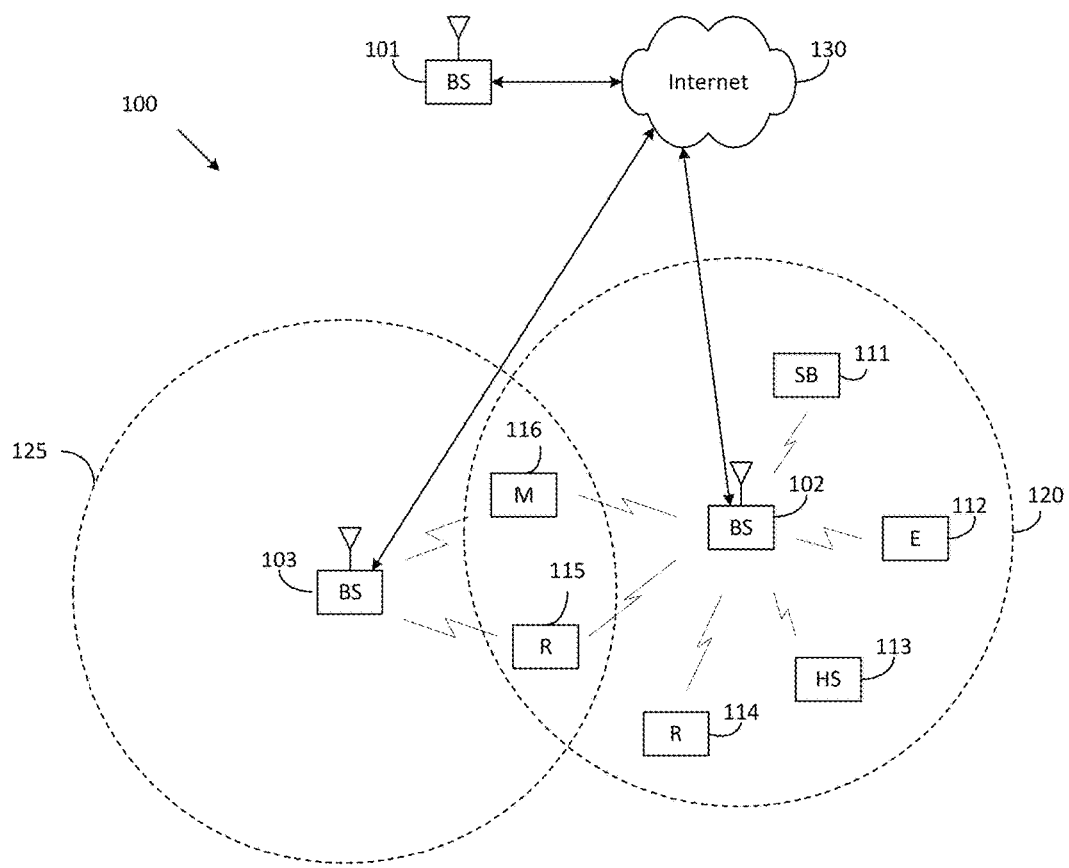
FIG. 1 illustrates an example wireless network according to embodiments of the present disclosure.
Figure 2:
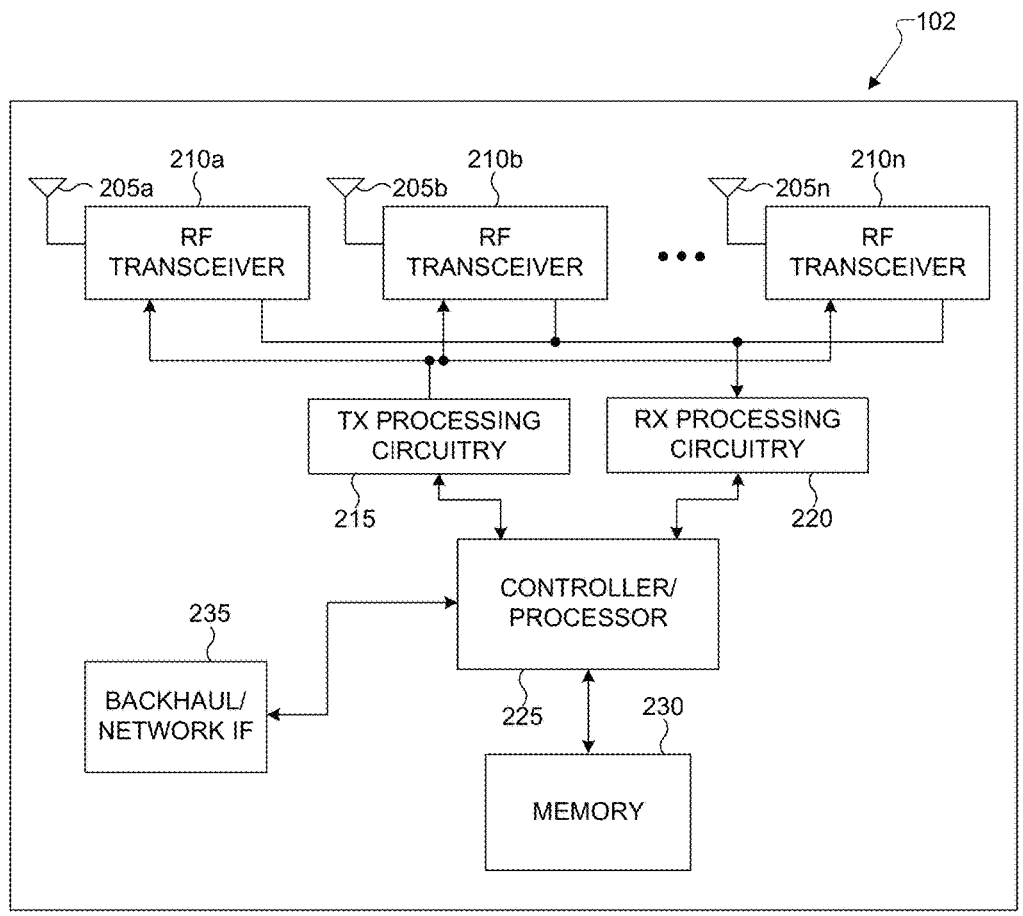
FIG. 2 illustrates an example eNB according to embodiments of the present disclosure.
Figure 3:
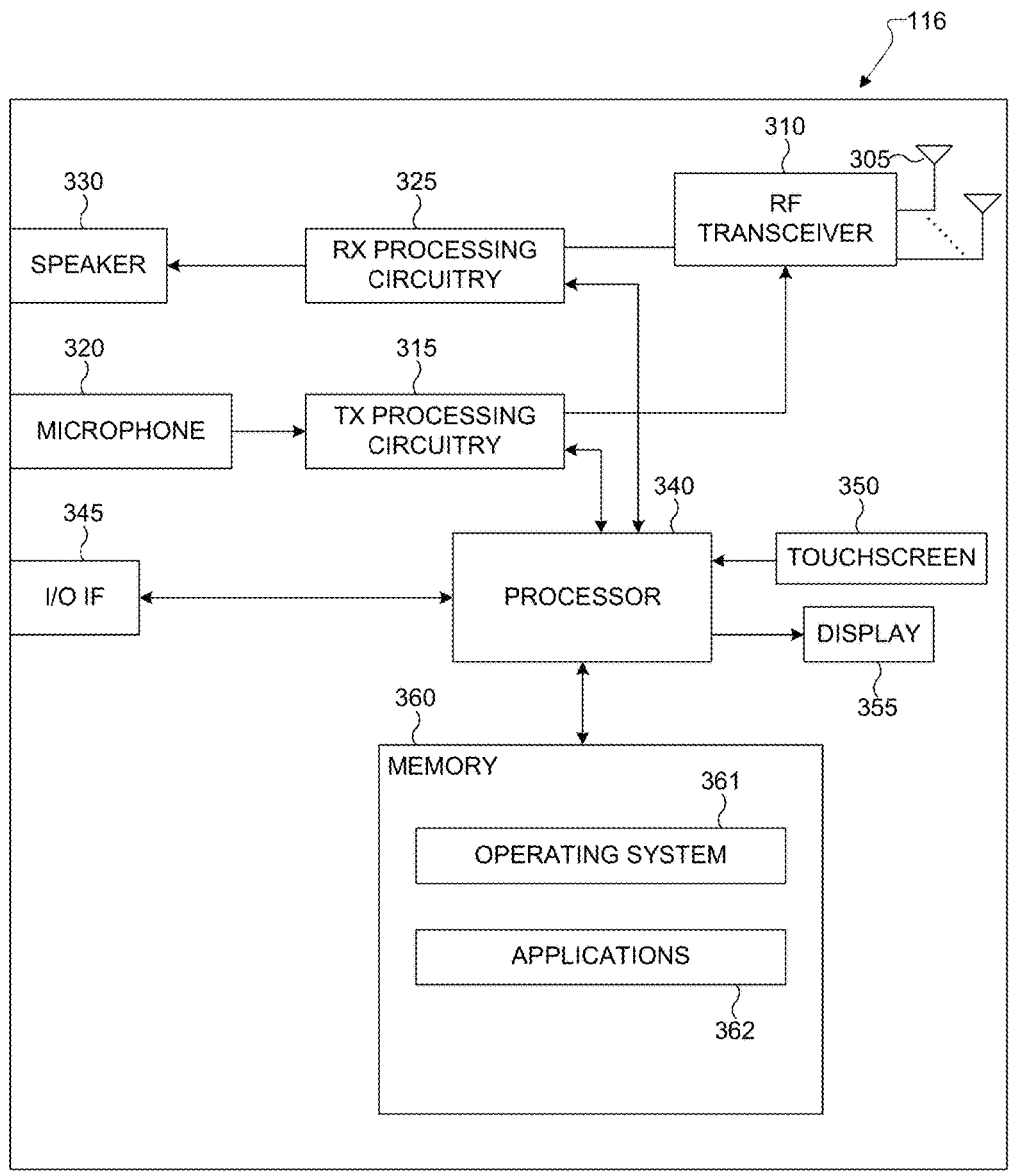
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is also capable of transmitting downlink signals comprising the set of transmission parameters using a multi-user multi-input multi-output (MU-MIMO). In some embodiments, the RF transceiver 210a-201n is also capable of transmitting the downlink signals comprising the multiplexed output signals through a plurality of antenna ports using the MU-MIMO. In some embodiments, the RF transceiver 210a-201n is also capable of receiving a report message from the at least one UE included in the plurality of groups. In some embodiments, the RF transceiver 210a-201n is also capable of broadcasting the downlink signals comprising the at least one available set of transmission parameters using the MU-MIMO. In some embodiments, the RF transceiver 210a-201n is also capable of receiving a response message including at least one preferred set of transmission parameters from the at least one UE.

In some embodiments, the RF transceiver 210a-201n is also capable of transmitting the downlink signals in at least one of multiplexing modes including a time division multiplexing (TDM) mode, a frequency division multiplexing (FDM) mode, or a space division multiplexing (SDM) mode in a same frequency band, the downlink signal comprising reference symbols located in different positions in the downlink signals and receiving a report message using uplink signals based on the transmitted downlink signals in at least one of multiplexing modes including a time division multiplexing (TDM) mode, a frequency division multiplexing (FDM) mode, or a space division multiplexing (SDM) mode in the same frequency band.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. As described in more detail below, the eNB 102 may include circuitry, programming, or a combination thereof for processing of CSI reporting on PUCCH. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is also capable of identifying a set of transmission parameters comprising a numerology, wherein the numerology includes a subcarrier spacing and determining a plurality of baseband signal generation chains each of which includes the set of transmission parameters comprising different numerology. In some embodiments, the controller/processor 225 is also capable of multiplexing output signals from the plurality of baseband signal generation chains each of which includes the set of transmission parameters comprising the different numerology.

In some embodiments, the controller/processor 225 is also capable of determining a plurality of precoders each of which includes the set of transmission parameters comprising the different numerology, the plurality of precoders being included the plurality baseband signal generation chains, converting output signals from each of the plurality of precoders to time domain signals using a plurality of inverse fast Fourier transforms (IFFTs), and adding a cyclic prefix (CP) to each of the time domain signals that is outputted from each of the plurality of precoders, wherein the time domain signals outputted from different precoders include different CP lengths.

In some embodiments, the controller/processor 225 is also capable of determining a plurality of groups comprising the at least one UE. In some embodiments, the controller/processor 225 is also capable of selecting a UE to be scheduled with the at least one UE included in a plurality of groups and compare the subcarriers spacing of the selected UE with the subcarriers spacing of the at least one UE included in the plurality of groups.

In some embodiments, the controller/processor 225 is also capable of interpolating at least one subcarrier included in the set of transmission parameters that is allocated to the at least one UE using an interpolation factor when the subcarrier spacing of the at least one UE is wider than the selected UE, decimating at least one subcarrier included in the set of transmission parameters that is allocated to the at least one UE using a decimate factor when the subcarrier spacing of the at least one UE is narrower than the selected UE, or maintaining the set of transmission parameters that is allocated to the at least one UE when the subcarrier spacing of the at least one UE is equal to the selected UE. In some embodiments, the controller/processor 225 is also capable of determining at least one available set of transmission parameters including the subcarriers spacing.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving downlink signals comprising at least one available set of transmission parameters using a multi-user multi-input multi-output (MU-MIMO). In some embodiments, the RF transceiver 310 is capable of receiving the downlink signals comprising a set of transmission parameters using the MU-MIMO and transmitting the report message including channel state information (CSI) based on the received downlink signals. In some embodiments, the RF transceiver 310 is capable of receiving the downlink signals in at least one of multiplexing modes including a time division multiplexing (TDM) mode, a frequency division multiplexing (FDM) mode, or a space division multiplexing (SDM) mode in a same frequency band, the downlink signals comprising reference symbols located in different positions in the downlink signals and transmitting the report message using uplink signals based on the received downlink signals in at least one of multiplexing modes including a time division multiplexing (TDM) mode, a frequency division multiplexing (FDM) mode, or a space division multiplexing (SDM) mode in the same frequency band.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of determining at least one preferred set of transmission parameters including a subcarriers spacing based on the received downlink signals, wherein the transceiver is further configured to transmit a report message including the at least one preferred set of transmission parameters. In some embodiments, the processor 340 is also capable of removing a cyclic prefix (CP) of the received downlink signals in a time domain and converting the CP removed downlink signals to frequency domain signals using a plurality of fast Fourier transforms (FFTs).

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
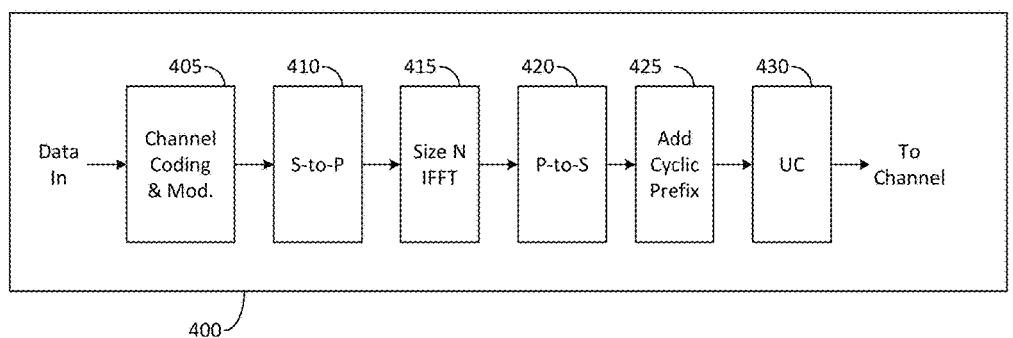
FIG. 4A illustrates a high-level diagram of an orthogonal frequency division multiple access transmit path according to embodiments of the present disclosure.
Figure 4B:
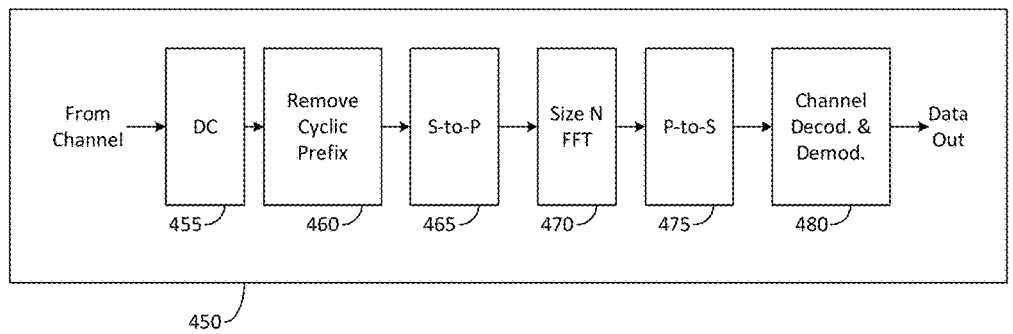
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

In wireless communication systems, several parameters are adapted on a UE-specific basis such as the modulation, the coding scheme or the rank of transmissions. However, in current cellular systems such as a long-term evolution (LTE), most numerology parameters such as the sub-carrier spacing or the length of the cyclic prefix (CP) for all users is cell-specific and common to all UEs. An LTE, for example, has a sub-carrier spacing of 15 kHz for transmissions (except for broadcast services using multicast-broadcast single-frequency network (MBSFN), which is fixed at 7.5 kHz sub-carrier spacing). For 5G communications, the new requirements proposed would benefit from adaptation of the sub-carrier spacing and/or CP length on a per user basis.

In particular, varying the sub-carrier spacing depending on the UE can provide the some advantages. One advantage is low latency transmissions. In such example, wider sub-carrier spacing can lead to shorter symbol duration, which reduces the transmission latency. The FFT/IFFT size also reduces, which can reduce the power consumption requirements. Another advantage is improved channel estimation for high speed users. At higher speeds, there is lower correlation between channel measurements. Hence, channel estimation should be done more frequently, which can be enabled with shorter symbol duration or wider subcarrier spacing. This can be beneficial for vehicular communication systems. Yet another advantage is low peak-to average power ratio (PAPR), as smaller sub-carrier spacing can lower PAPR. Yet another advantage is to be able to better support large bandwidth systems. Using 15 KHz sub-carrier spacings for large bandwidth systems would require large FFT sizes, which may lead to implementation constraints. For example, a 120 MHz system would require a FFT of size 8192 or larger. If wider subcarrier spacing is utilized, the FFT size can be reduced. Yet another advantage is for better supporting mmWave systems. At mmWave frequencies, a larger sub-carrier spacing may be required to compensate for increased phase noise in the RF.

In particular, varying the CP length depending on the UE can provide advantages, including improved efficiency; since the CP is an overhead for the transmission, reducing the CP can lead to improved efficiency in transmission.

Figure 5:
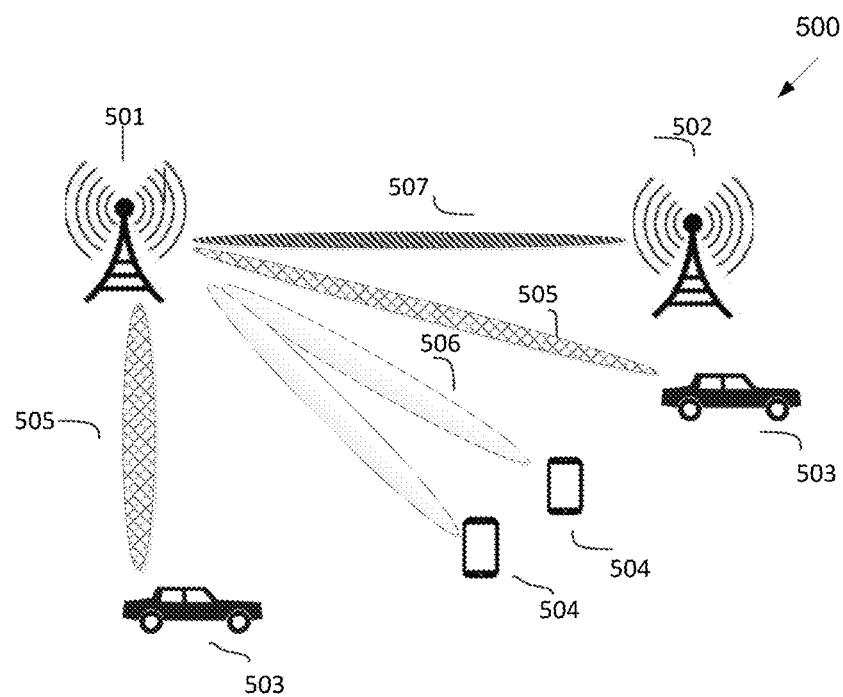
FIG. 5 illustrates an extension of multi-user multi-input multi-output (MU-MIMO) to support users with diverse requirements according to embodiments of the present disclosure.

FIG. 5 500 illustrates an extension of multi-user multi-input multi-output (MU-MIMO) to support users with diverse requirements according to embodiments of the present disclosure. An embodiment of the extension of multi-user multi-input multi-output (MU-MIMO) shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure. As shown FIG. 5, the extension of MU-MIMO 500 comprises a plurality of base stations 501 and 502, a plurality of UEs 504, a plurality of vehicles 503, and a plurality of beams 505 with a first numerology, 506 with a second numerology, and 507 with a third numerology.

FIG. 5 500 shows the extension of MU-MIMO to support users with diverse requirements such as static indoors, vehicles, trains, mission critical services and industrial automation using the same time and frequency resource to improve capacity. The eNB (e.g., gNB, base station) 501 can communicate with various user types such as another eNB 502, a car (e.g., vehicle) 503 and a mobile device (e.g., UE) 504, each with different numerology but using the same time and frequency resources. The eNB 501 communicates with the eNB 502 using a first numerology type 507. In this case, the numerology may be optimized to have a larger CP length and larger subcarrier spacing in order to support a longer distance and a large bandwidth. The eNB 501 may communicate with cars 503 using the beam 505 (e.g., a second numerology type), where the subcarrier spacing and CP length may be optimized for high speed and smaller bandwidths. The eNB 501 may communicate with the UE 504 (e.g., mobile devices) using the regular CP and subcarrier spacing.

Figure 6:
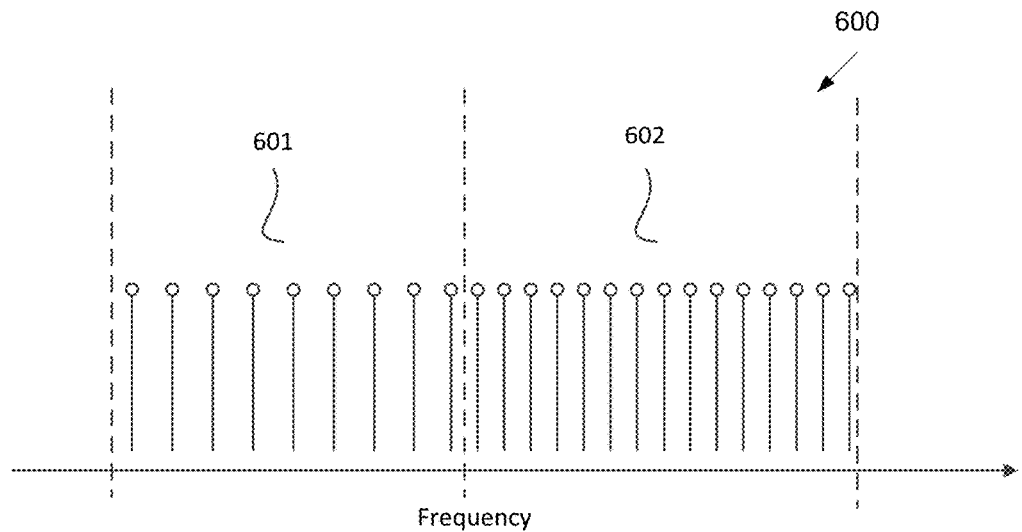
FIG. 6 illustrates a user equipment (UE) specific sub-carrier spacing in a orthogonal frequency division multiple access (OFDMA) according to embodiments of the present disclosure.

FIG. 6 600 illustrates a UE-specific sub-carrier spacing in an orthogonal frequency division multiple access (OFDMA) systems according to some embodiments of the present disclosure. An embodiment of UE-specific sub-carrier spacing 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

FIG. 6, 600, comprises two different groups of frequencies 601 and 602 allocated to two different UEs. Using OFDMA, one user uses one sub-carrier spacing in a sub-band 601, while another user uses a different sub-carrier spacing in another sub-band 602.

In some embodiments, a MIMO operation (e.g., in the same time and frequency) using different sub-carrier spacing is provided.

A method to support flexible numerology configuration for UE sub-carrier spacing, CP length and bandwidth in multi-user MIMO systems. In one embodiment, (a) the users are grouped according to the chosen numerology; (b) a different precoder and FFT size are used per numerology at the transmitter; (c) the precoded signals for the multiple numerologies are added in the time domain before transmission.

In some embodiments, the interference suppression among the different users during precoding for a chosen sub-carrier spacing is done by re-sampling (interpolating or decimating) the channel estimates of the different users to the chosen sub-carrier spacing.

Common reference signals (CRS) are designed on per-sub-carrier spacing basis and are designed not to overlap in time or frequency. UEs with different sub-carrier spacing values will search in different locations of the frame for the common reference signals.

According to embodiments of the present disclosure, an additional flexibility and improved spectral efficiency for supporting user-specific sub-carrier spacing over existing art are provided. Further, it does not require any additional signal processing complexity on the UE side. With the increased requirements of devices to be connected and limited amount of spectrum, the ability to support multiple users with flexible numerology such as variable sub-carrier spacing, a CP length and bandwidth at the same time and frequency is an important feature for enabling 5G with diverse requirements.

Figure 7:
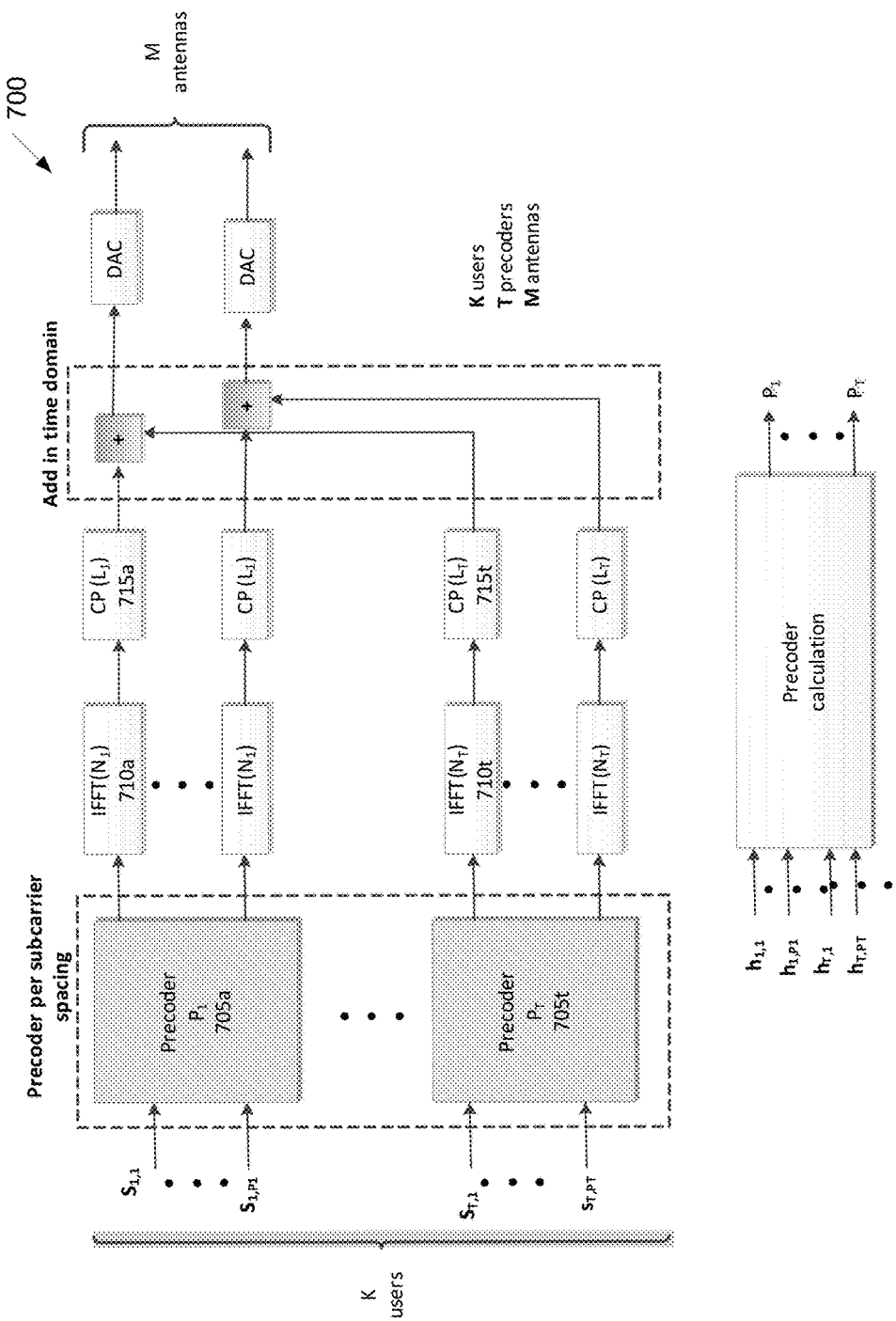
FIG. 7 illustrates a MIMO transmission chain on a downlink according to embodiments of the present disclosure.

FIG. 7 700 illustrates a MIMO transmission chain on downlink according to embodiments of the present disclosure. An embodiment of the MIMO transmission chain shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure. As shown in FIG. 7, the MIMO transmission chain 700 comprises a plurality of precoders 705a and 705t, a plurality of inverse fast Fourier transforms (IFFTs) 710a and 710t, and a plurality of CPs 715a and 715t.

As shown In FIG. 7, K users are present, each of which is served with a single stream (i.e., a rank-1 transmission). The K users are grouped into T groups, each of which is configured with a different sub-carrier spacing and/or CP length. Let the users be denoted as $s_{t,j}$ where t is the group number and j is the index of the user within the group. Each group of users is precoded separately in the frequency domain using a precoder $P_t$ 705t. Each precoder output is converted to the time-domain using an IFFT size of $N_t$ depending on the desired sub-carrier spacing and a cyclic prefix (CP) is added of the desired length $L_t$. The output of all the different groups is then added in the time-domain and then sent to the RF with M antennas for transmission. Let the channel estimates of the users be denoted as $h_{t,j}$ where t is the group number and j is the index of the user within the group. These channel estimates are used to compute the precoder $P_t$ 705t. Multiple precoding methods have been developed in the past—however, these assume a single numerology for precoding operation. The precoder designs in this disclosure provide designs that support multiple numerologies.

In one embodiment, the transmission of the user's data is aligned to the symbol of the users with the smallest sub-carrier spacing (e.g., largest symbol length).

Figure 8:
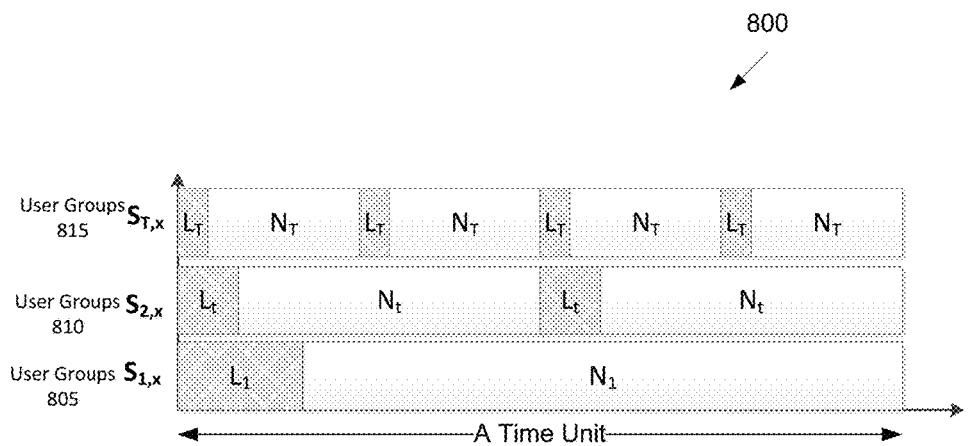
FIG. 8 illustrates an alignment of different sub-carrier spacings and cyclic prefix (CP) lengths within a time unit according to embodiments of the present disclosure.

FIG. 8 800 illustrates an alignment of different sub-carrier spacings and cyclic prefix (CP) lengths within a time unit according to embodiments of the present disclosure. An embodiment of the alignment of different sub-carrier spacings and cyclic prefix (CP) lengths within a time unit shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure. As shown in FIG. 8, subbands allocated to different user groups 805, 810, 815 and with different sub-carrier spacings and CP lengths are aligned within a time unit.

In FIG. 8 a first user group 805 with the smallest sub-carrier spacing is denoted as $s_{1,x}$, and a user group with second smallest subcarrier spacing is denoted as $s_{2,x}$, and so on. The length of an OFDM symbol of a user group 1 805 is configured to be the same as an integer $p_t$ multiple of the length of an OFDM symbol of a user group t 810: $p_t(N_t+L_t)=N_1+L_1$. In FIG. 8, the longest OFDM symbol length, i.e., $N_1+L_1$, is denoted as a time unit. Furthermore, the starting times of the first OFDM symbol of the OFDM symbols belonging to different user groups are aligned (synchronized) for all t=1, . . . , T. This will simplify the frame structure design to allow multiple UEs with variable sub-carrier spacing and CP lengths to be allocated in a frame.

In addition, it may also be beneficial to have the sub-carrier spacings of the user groups 805, 810, 815 be multiples of each other to help make FFT sizes easily configurable in hardware and to support re-sampling (e.g., interpolation or decimation) of channel estimates in the frequency domain to adapt to the variable sub-carrier spacing. i.e. $P_t \cdot N_t = N_1$.

In an alternative embodiment, the CP lengths are not necessarily reduced with sub-carrier spacing.

Figure 9:
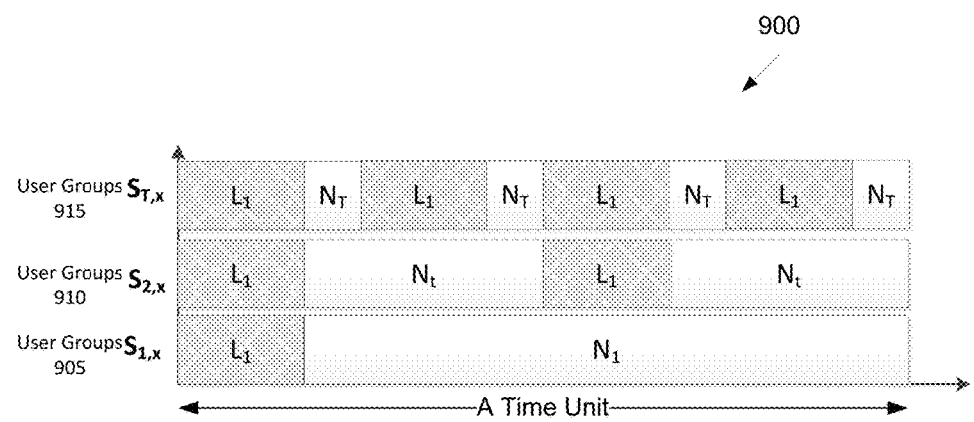
FIG. 9 illustrates an alignment of different sub-carrier spacing and CP length within a time unit according to embodiments of the present disclosure.

FIG. 9 900 illustrates an alignment of different sub-carrier spacing and CP length within a time unit according to embodiments of the present disclosure. An embodiment of the alignment of different sub-carrier spacing and CP length within a time unit shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure. As shown in FIG. 9, subbands allocated to different user groups 905, 910, 915 and with different sub-carrier spacings and CP lengths are aligned within a time unit. FIG. 9 shows an alternate embodiment where the CP length is fixed to that of the largest CP requirement in the cell, i.e., $L_t=L_1$ for all t=1, . . ., T, where $L_1$ is decided based on the delay spread requirement to support all UEs in the cell.

Due to the use of different sub-carrier spacings, the channel estimate for a particular UE in the frequency domain received at the eNB or base-station may have different resolution, depending on the sub-carrier spacing group of the UE. This variation in the estimate of the channel estimation resolution needs to be accounted for in the design of the precoder for the different user groups. This is illustrated in FIG. 10.

Figure 10:
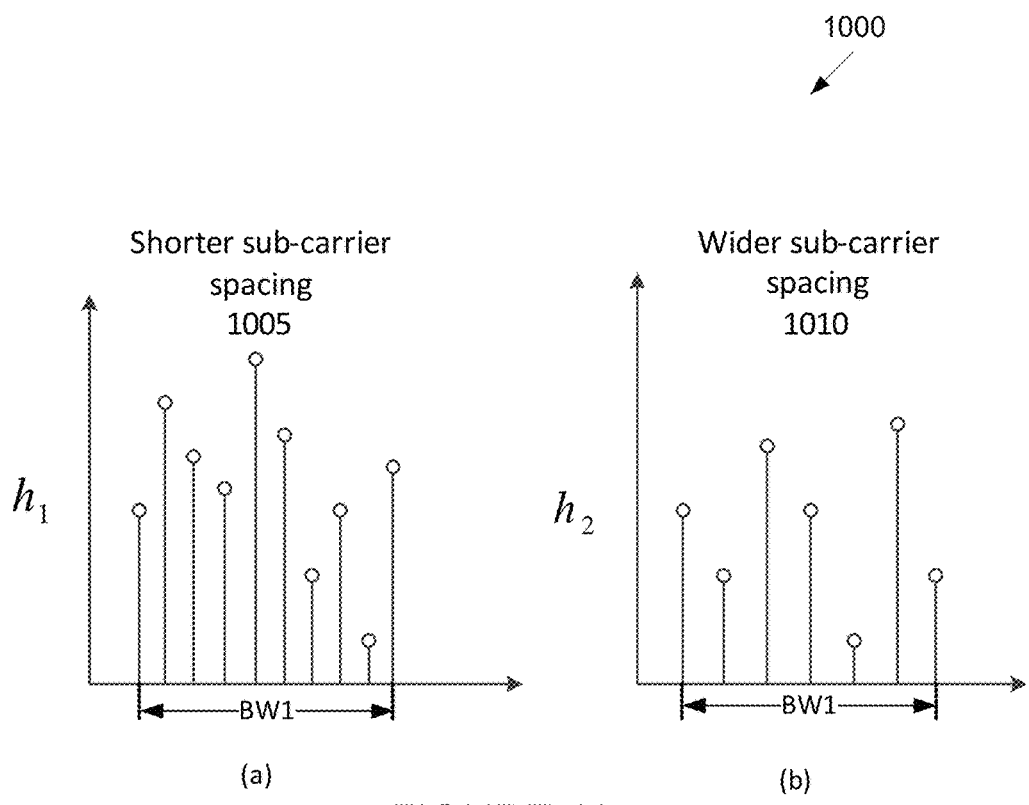
FIG. 10 illustrates an application of shorter and wider subcarrier spacing in a BW according to embodiments of the present disclosure.

FIG. 10 1000 illustrates an application of shorter and wider subcarrier spacing in a BW according to embodiments of the present disclosure. An embodiment of the application of shorter and wider subcarrier spacing in a BW shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In FIG. 10, the channel estimates $h_1$ and $h_2$ for 2 users in the same bandwidth, BW1, have different frequency resolutions, depending on the sub-carrier spacing. For a UE with shorter sub-carrier spacing 1005, the channel estimate in the frequency domain may have higher resolution compared to a UE with wider sub-carrier spacing 1010. Furthermore, the frequency locations of the first (lowest-indexed) subcarrier of the T user groups are aligned (synchronized) for all t=1, . . . , T.

In case of conjugate beamforming, each user's estimate of the channel is conjugated and used as the precoder for that user and all other users are ignored, irrespective of their numerology choice. Hence, the conjugate beamforming precoder is not impacted by this design as given in equation (1):

$$P_j = h_j^H \quad (1)$$

where j is the user index, P is the precoder, and h is the channel estimate.

Since the channel estimate is already at the correct resolution for the desired sub-carrier spacing for the user, there is no additional interpolation or decimation of the estimate needed in this case.

More advanced precoding schemes such as precoding using signal to leakage noise ratio maximization (SLNR) or minimum mean square error (MMSE) based techniques use the channel estimate of all users in order to compute the precoding weights. Since different user groups can have different resolutions for the channel estimates, the channel estimates for the users need to be aligned to the sub-carrier spacing of the precoder in order to minimize the interference between the users. The channel estimates is given by equation (2):

$$P_j = h_j^H (HH^H + \sigma^2 I)^{-1} \quad (2)$$

where j is the user index, h is the channel estimate of the user, H is a matrix formed by stacking the "resampled" channel estimates of the different users, and I is the identity matrix and $\sigma^{-2}$ is the estimated noise variance.

Since user groups have different frequency resolutions, their channel estimates are first aligned (interpolated/decimated) for MU pre-coder design. Without loss of generality, it can assume that user groups t=1, . . . , T are sorted in increasing order of sub-carrier spacings. Let $h_{u,t,j}$ be the channel estimate for user u in user group t at sub-carrier j, where u=1, . . . , $K_t$, t=1, . . . , T, and j=1, . . . , $N_t$. Let $h_{u,t,j,r}$ denote user u's channel estimates after $h_{u,t,j}$ is interpolated/decimated by a factor r, where r=$p_t/p_{t'}$ and t'=1, . . . , T. Note that t'>t implies interpolation, and t'<t implies decimation. The stacked channel matrix for user group t at sub-carrier j is defined as equation (3):

$$H_{t,j} = [S_t(1) \quad S_t(2) \quad \ldots \quad S_t(t) \quad \ldots \quad S_t(T-1) \quad S_t(T)], \quad (3)$$

$$\text{where } S_t(t') = \left[ h_{1,t',j,\frac{p_{t'}}{p_t}} \quad h_{2,t',j,\frac{p_{t'}}{p_t}} \quad \ldots \quad h_{K_{t'},t',j,\frac{p_{t'}}{p_t}} \right]$$

The SLNR precoder for user u in user group t at sub-carrier j is then given by equation (4):

$$P_{u,t,j} = h_{u,t,j}^H (H_{t,j} H_{t,j}^H + \sigma^2 I)^{-1} \quad (4)$$

where $\sigma^{-2}$ is the estimated noise variance. The overall precoder for user group t at subcarrier j is then given by:

$$P_{t,j} = [P_{1,t,j} \, P_{2,t,j} \ldots P_{K_t,t,j}].$$

Note that in practice, the precoding is performed per subband (SB) which comprises of consecutive sub-carriers. For per SB SLNR precoding, the channel estimates in equation (3) and (4) may be replaced with the dominant eigenvector (associated with the largest eigenvalue) of the average covariance matrix of channel estimates within the SB.

Figure 11:
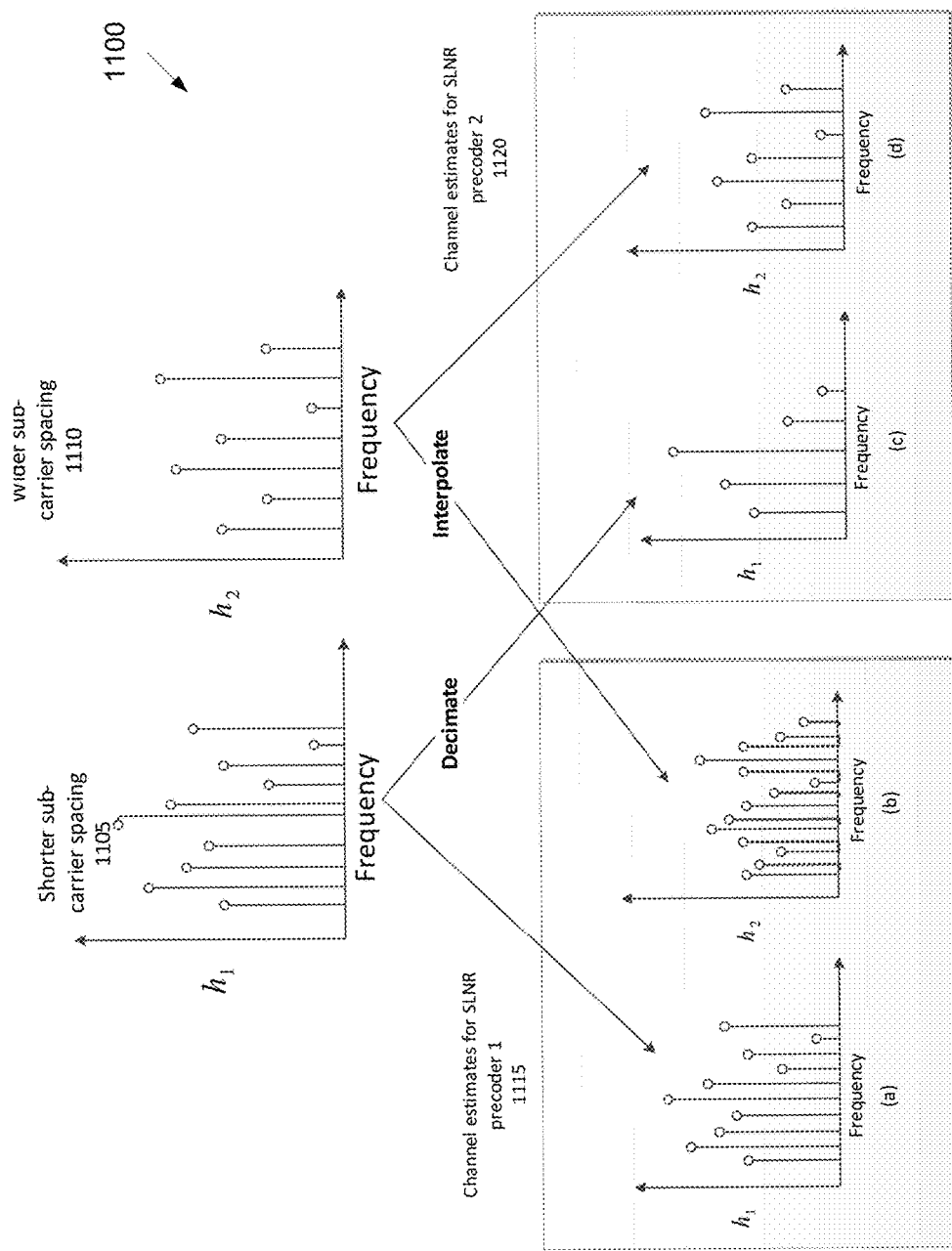
FIG. 11 illustrates a method to derive and align channel estimates of users belonging to different precoder groups according to embodiments of the present disclosure.

FIG. 11 1100 illustrates a method to derive and align channel estimates of users belonging to different precoder groups (i.e., 805, 810, 815; or 905, 910, 915) according to embodiments of the present disclosure. An embodiment of the derivation and alignment of channel estimates of users shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

FIG. 11 shows the alignment of channel estimates to derive MU precoders for the users belonging to a shorter sub-carrier spacing 1105. In this case, the frequency domain channel estimates of the users with wider sub-carrier spacing are interpolated to align to the shorter sub-carrier spacing 1105. Once aligned, the precoder weights for the shorter sub-carrier spacing 1105 can now be computed. The channel estimates for SLNR precoder 1 1115 and the channel estimates for SLNR precoder 2 1120 illustrated in FIG. 11 show the alignment of channel estimates for the users belonging to the wider sub-carrier spacing 1110. In this case, the frequency domain channel estimates of the users with the shorter sub-carrier spacing 1105 are decimated to align to the wider sub-carrier spacing 1110. Once aligned, the precoder weights for the wider sub-carrier spacing 1110 can now be computed using equation (2). Note that this proposed concept of channel interpolation and decimation for MU precoding for multiple numerologies is general and is applicable to any MU precoding that is based on channel estimation.

Figure 12:
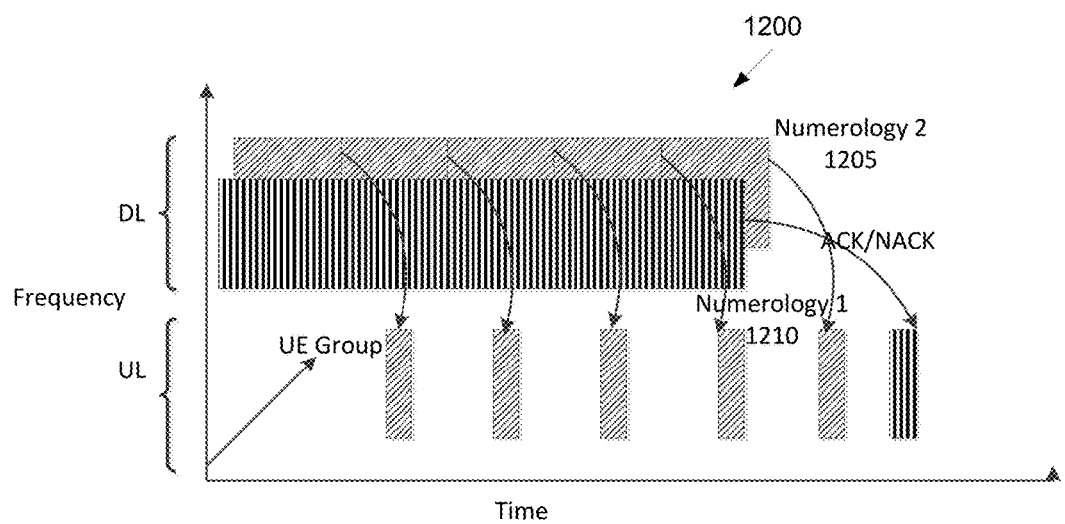
FIG. 12 illustrates a multiplexing of uplink and downlink transmissions for the different numerologies according to embodiments of the present disclosure.

FIG. 12 1200 illustrates a multiplexing of uplink and downlink transmissions for the different numerologies according to embodiments of the present disclosure. An embodiment of the multiplexing of uplink and downlink transmissions shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure. As shown in FIG. 12, the multiplexing of uplink and downlink transmissions 1200 comprises a numerology 2 1205 and a numerology 1 1210.

The numerology with the shorter latency (numerology 2 1205) gets an acknowledgement/negative-acknowledgement (ACK/NACK) more rapidly and frequently than the numerology with the larger latency (numerology 1 1210). The multiplexing is assumed to be FDD so that the UL for the shorter latency users can be received even during the DL transmission of the larger latency users.

Figure 13:
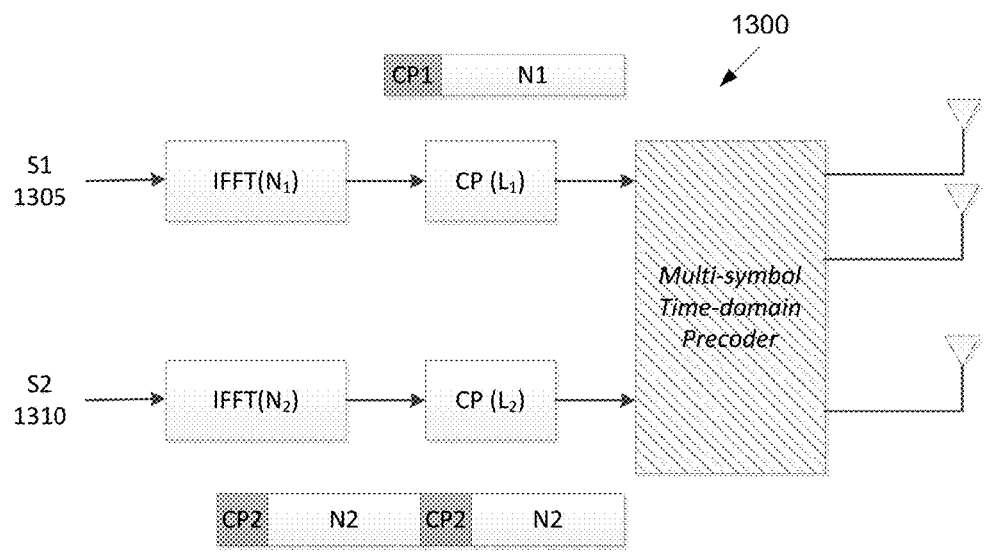
FIG. 13 illustrates a time domain wideband precoding according to embodiments of the present disclosure.

FIG. 13 1300 illustrates a time domain wideband precoding 1300 according to embodiments of the present disclosure. An embodiment of the time domain wideband precoding shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure. As shown in FIG. 13, the time domain wideband precoding 1300 comprises a user stream 1 1305 and a user stream 2 1310.

In some embodiments, a wideband precoder in the time-domain could also be considered with time domain precoding for different user groups. FIG. 13 shows a time domain wideband precoding as an alternative embodiment of the present disclosure where the beamforming (spatial separation) for the different users is done in the time domain in the analog or RF. This may be useful for mmWave systems for example, where the number of antennas may be very large (10-100's) and it may not be feasible to implement frequency domain precoding due to the need to have large number of digital chains.

Figure 14:
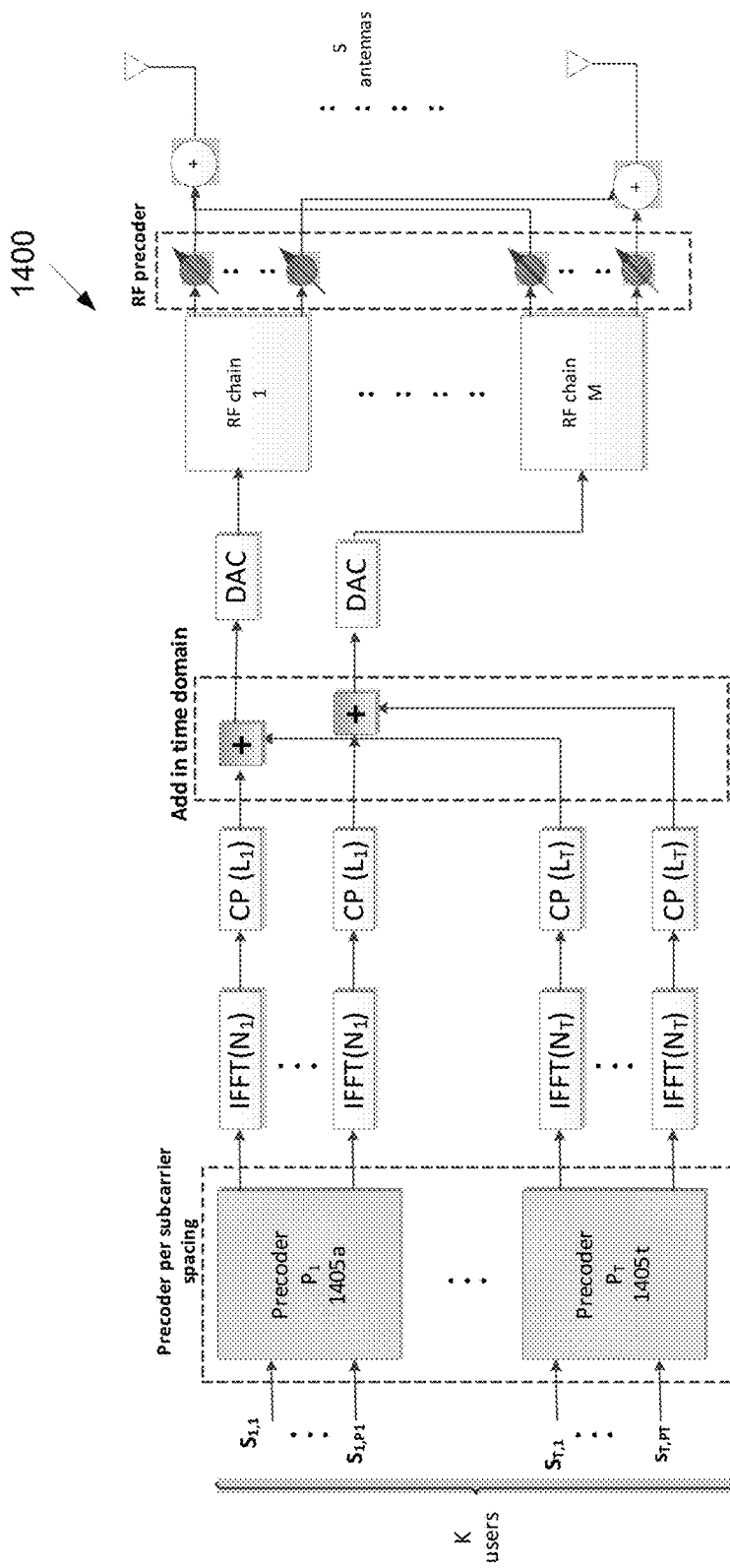
FIG. 14 illustrates a hybrid precoding in time and frequency domain according to embodiments of the present disclosure.

FIG. 14 1400 illustrates a hybrid precoding in time and frequency domain according to embodiments of the present disclosure. An embodiment of the hybrid precoding in time and frequency domain shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure. As shown in FIG. 14, the hybrid precoding in time and frequency domain 1400 comprises a plurality of precoders P1 1405a and Pt 1405t.

In FIG. 14, the RF precoders (1405a m 1405t) can be used to provide further interference suppression between the multiple numerologies due to the use of a larger number of antennas (from M antennas for digital only precoding to S antennas using RF precoding where S $\gg$ M). Thus, a performance of a large antenna array system can be applied for the flexible numerology system while limiting the implementation complexity.

Figure 15:
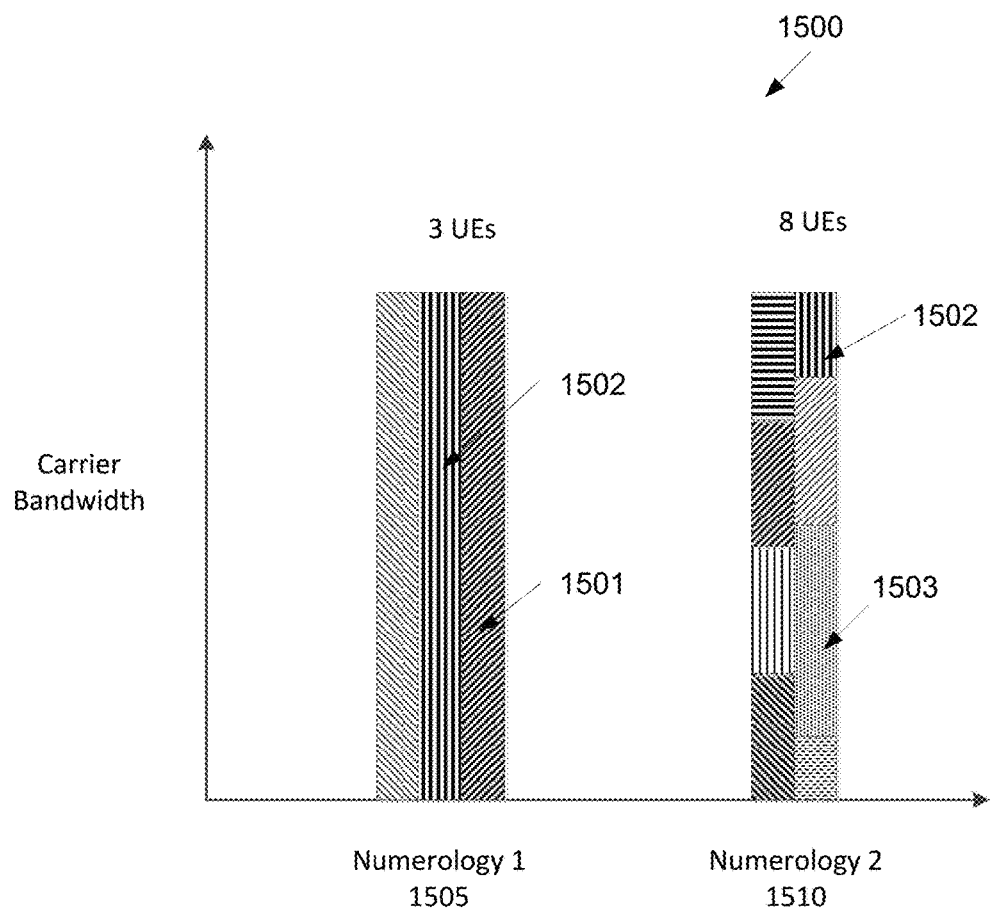
FIG. 15 illustrates a multiplexing in a frequency domain according to embodiments of the present disclosure.

FIG. 15 1500 illustrates a multiplexing in a frequency domain 1500 according to embodiments of the present disclosure. An embodiment of the multiplexing in a frequency domain shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure. As shown in FIG. 15, the multiplexing in a frequency domain 1500 comprises a plurality of UEs 1501, 1502, and 1503, a numerology 1 1505 and a numerology 2 1510.

The different numerologies need not use the same bandwidth as well. As shown in FIG. 15, the users can be multiplexed in the frequency domain within a given numerology since the precoding can be done in the frequency domain. UE 1501 and UE 1503 have different numerologies as well as different bandwidths. In addition, it is possible that the same user may support different numerologies depending on the application. For example, UE 1502 can use numerology 1 1505 and/or numerology 2 1510 on a dynamic basis depending on the application requirements.

In terms of additional complexity, an additional M FFT engines at the base-station per user group may be added, where M is the number of antennas. The FFT engine size is dependent on the sub-carrier spacing. Since this complexity increase is at the base-station, additional complexity may be acceptable for an implementation.

At the UE side, there is no additional signal processing requirement. The UE may need to dynamically configure the FFT size and CP length, depending on the information provided by the eNB.

The information about the numerology configuration (including parameters such as sub-carrier spacing, CP, FFT size, SF length) may need to be communicated by the eNB to the UE, by either a broadcast signaling or a UE-specific radio resource control (RRC) signaling message. The pilot configuration (including a mapping pattern and the BW in which the pilot resides) may need to be implicitly or explicitly signaled to a UE in conjunction with the numerology configuration.

In particular, the pilots can be designed according to a specific sub-carrier spacing, such that pilots of the smaller sub-carrier spacing users do not fall in the same frequency band as the pilots belonging to the larger sub-carrier spacing users. This may not be an issue to support if the sub-carrier spacings are integral multiples of a base spacing such as 15 KHz, for example, a 15 KHz, 30 KHz, and so on.

Figure 16:
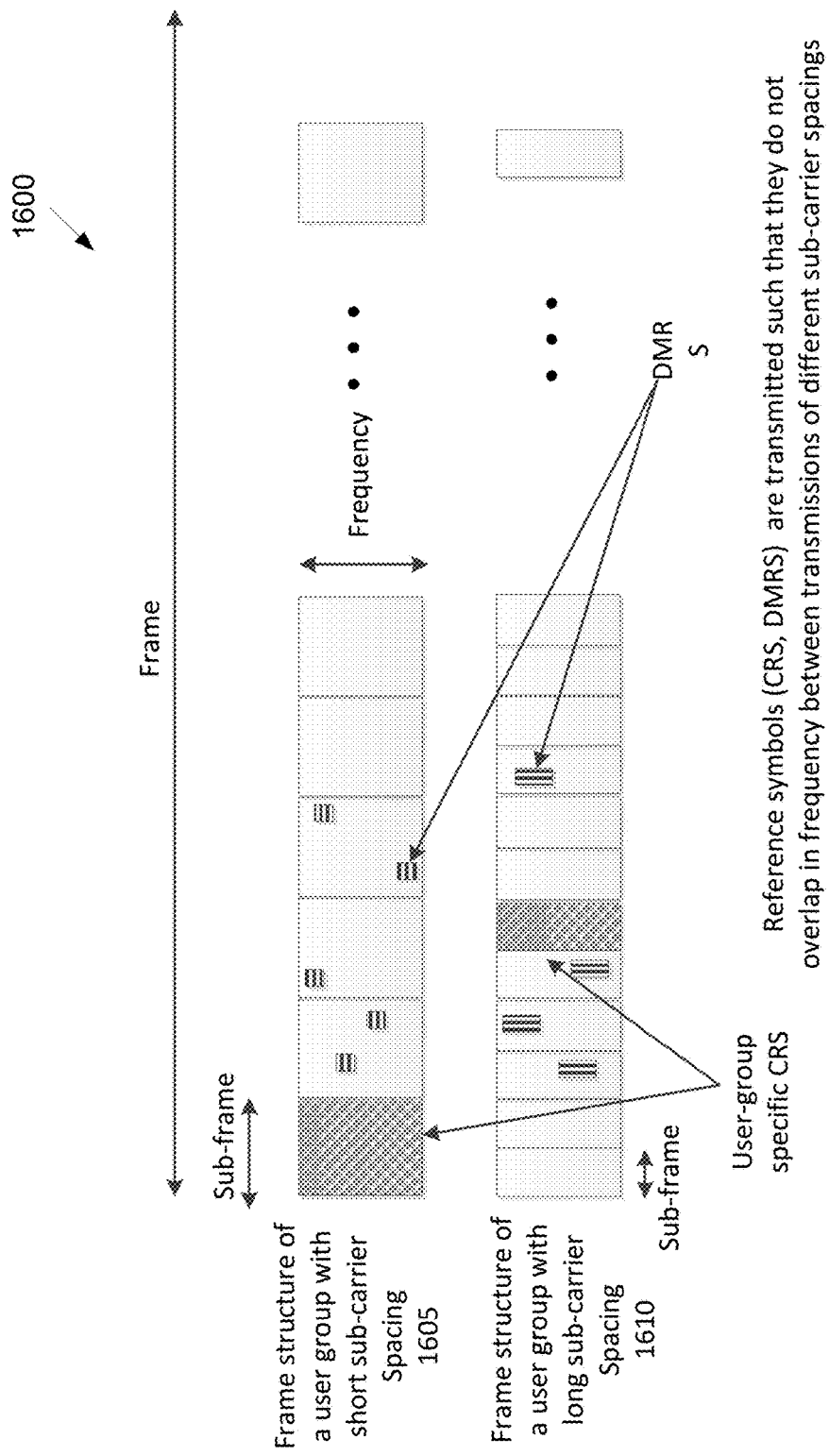
FIG. 16 illustrates frame structures for two user groups according to embodiments of the present disclosure.

FIG. 16 1600 illustrates frame structures for two user groups according to embodiments of the present disclosure. An embodiment of the frame structures for two user groups in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure. As shown in FIG. 16, the frame structures for two user groups 1600 comprises a frame structure of a user group with short sub-carrier spacing 1605 and a frame structure of a user group with long sub-carrier spacing 1610.

As illustrated in FIG. 16, frame structures are configured respectively for two user groups which are respectively associated with two different subcarrier spacings 1605 and 1610. A first user group is configured with a subcarrier spacing being equal to 1/S of a subcarrier spacing for a second user group, wherein S=2 in this illustration. In this case, the length of a subframe of the first user group is S times larger than the length of a subframe for the second user group.

Traditionally the common reference signal (CRS) is broadcast to all UEs. When different sub-carrier spacings 1605 (e.g., UE groups, a short sub-carrier group) and 1610 (e.g., user groups, a long sub-carrier group) can be configured to the UEs, this is no longer possible since the symbol lengths and FFT sizes can be different. Hence, a user-group specific CRS needs to be transmitted to UEs configured with a particular sub-carrier spacing. The user group specific CRS transmissions should not overlap in time or frequency. In this case, the time and frequency location of CRS can be differently configured for the two UEs configured with two different subcarrier spacings 1605 and 1610. As shown in FIG. 16, the demodulation reference signal (DMRS) can also be configured such that there is no overlap in time or frequency between the transmissions for the different sub-carrier spacings. As illustrated in FIG. 16, a subcarrier spacing can be used to determined other related parameters for defining a frame structure. Suppose that a default set of parameters are configured for subcarrier spacing $s_1$ kHz, OFDM symbol length $l_1$ micro-sec, subframe length or TTI (transmission time interval) of $L_1$ OFDM symbols or $l_1 \cdot L_1$ micro-sec.

In some embodiments, a UE is configured with a parameter, S, to indicate the subcarrier spacing: the subcarrier spacing for the UE is determined as $S \cdot s_1$ kHz; then the OFDM symbol length is $l_1/S$, and hence the subframe length or TTI length is $l_1 \cdot L_1/S$ micro-sec. Other parameters such as CP length and FFT size are also tied to this particular choice of subcarrier spacing.

Figure 17:
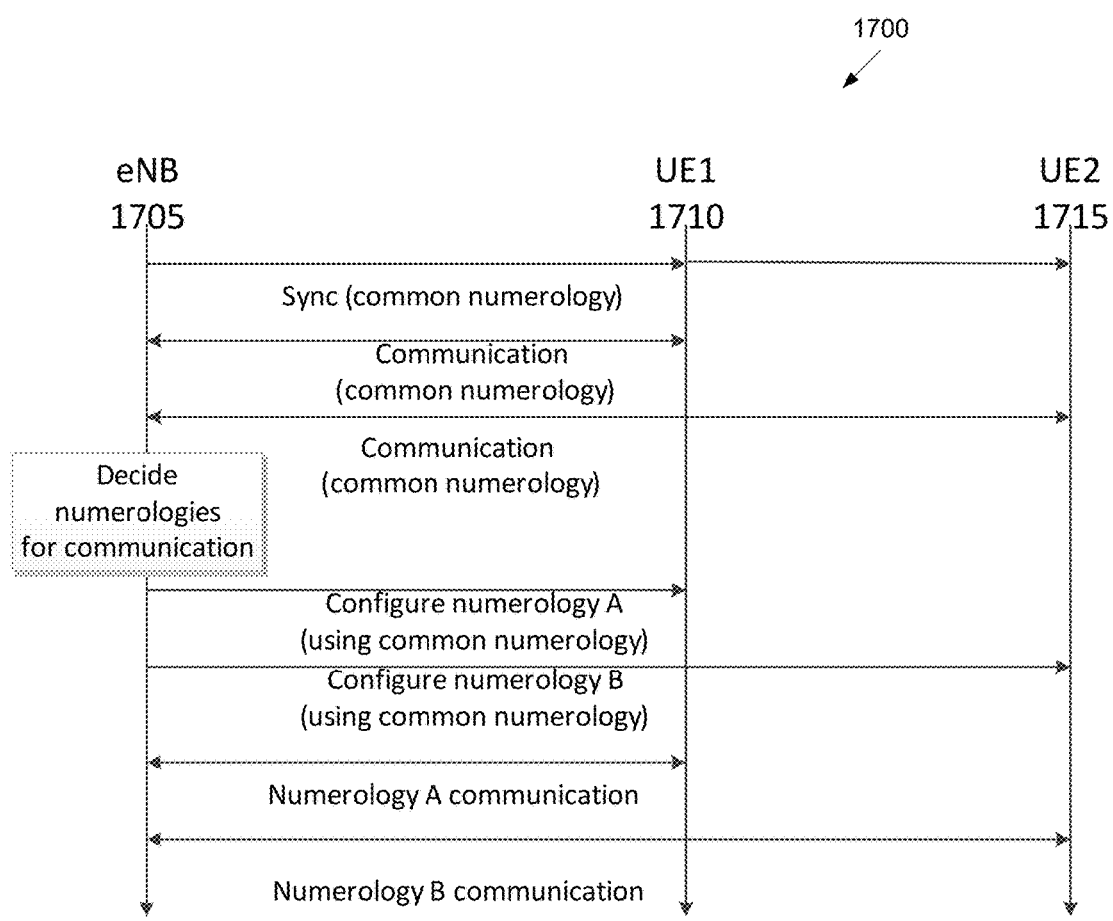
FIG. 17 illustrates an operational procedure for configuring a communication of multiple devices with different numerologies according to embodiments of the present disclosure.

FIG. 17 1700 illustrates an operational procedure for configuring a communication of multiple devices with different numerologies according to embodiments of the present disclosure. An embodiment of the operational procedure for configuring a communication of multiple devices with different numerologies shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure. As shown in FIG. 17, the operational procedure for configuring a communication of multiple devices with different numerologies 1700 comprises an eNB 1705, a UE 1 1710, and a UE 2 1715.

As shown in FIG. 17, the eNB 1705 initially communicates with multiple devices (e.g., UE1 1710 and UE2 1715) using a common numerology that is supported by all devices in that frequency band. Based on information such as the UE capability and the traffic service requested to be supported, the eNB 1705 decides the numerology to be configured for each device; e.g., a numerology A for the UE1 1710 and a numerology B for the UE2 1715. It is also possible for the UE to request a particular numerology for its application, for example, by the eNB broadcasting a set of possible numerologies in its SIB. The UE (e.g., the UE 1 1710, the UE 2 1715) can request a particular numerology. The eNB 1705 then indicates to the devices of the change in the numerology and that future transmissions may be occurring with a potentially different numerology which may be specific to the given UE. This indication can be done via RRC for the UE (e.g., the UE 1 1710, the UE 2 1715) using the common numerology, for example. Each UE does not need to know about the existence of other UEs with a potentially different numerology. Once configured, the communication between the eNB 1705 and the UEs (e.g., the UE 1710, the UE 2 1715) configured with different numerologies can be performed in a TDM or FDM or SDM manner.

Figure 18:
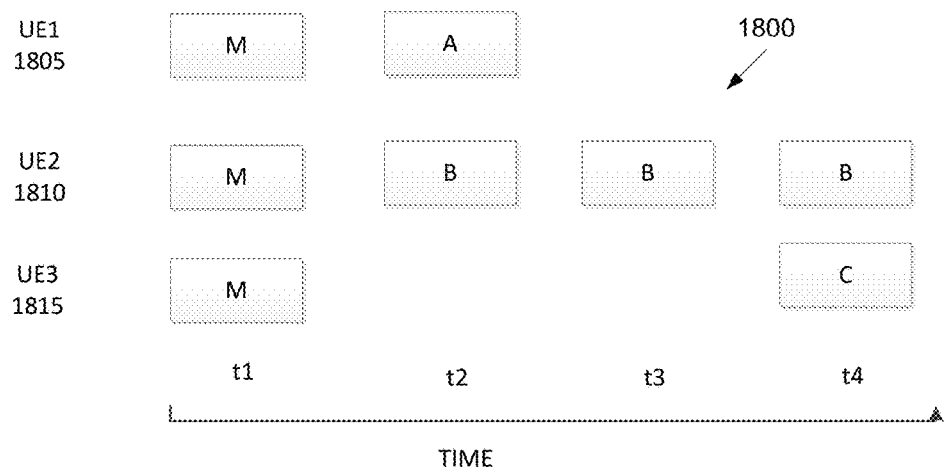
FIG. 18 illustrates multiple numerologies in a time division multiplexing (TDM) and space division multiplexing (SDM) according to embodiments of the present disclosure.

FIG. 18 1800 illustrates multiple numerologies in a time division multiplexing (TDM) and space division multiplexing (SDM) according to embodiments of the present disclosure. An embodiment of the multiple numerologies in a time division multiplexing (TDM) and space division multiplexing (SDM) shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure. As shown in FIG. 18, the multiple numerologies in the TDM and SDM 1800 comprise a plurality of UEs 1805, 1810, and 1815.

The multiple UEs (e.g., 1805, 1810, and 1815) could be operating in a common numerology M at time t1. At time t2, the UE1 1805 could be operating with a numerology A and the UE 2 1810 could be operating with a numerology B in the same frequency band using SDM. At time t3, only the UE 2 1810 could be operating with a given numerology B.

At time t4, the UE 2 1810 could be operating with the numerology B and the UE3 1815 could be operating with a numerology C in the same frequency band using SDM.

Figure 19:
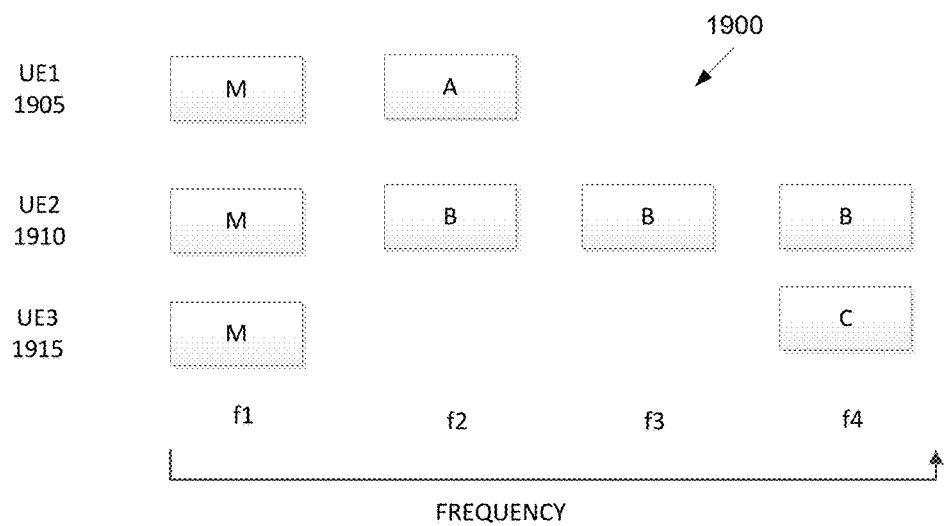
FIG. 19 illustrates another multiple numerologies in an FDM and SDM according to embodiments of the present disclosure.

FIG. 19 1900 illustrates another multiple numerologies in an FDM and SDM according to embodiments of the present disclosure. An embodiment of the multiple numerologies in an FDM and SDM shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure. As shown in FIG. 19, the multiple numerologies in the FDM and SDM 1900 comprise a plurality of UEs 1905, 1910, and 1915.

The multiple UEs (e.g., 1905, 1910, and 1915) in FIG. 19 could be operating in a common numerology M in the same frequency band f1. In frequency band f2, the UE 1 1905 could be operating with a numerology A and the UE 2 1910 could be operating with a numerology B in the same time using SDM. In frequency band f3, only the UE 2 1910 could be operating with a given numerology B. In frequency band f4, the UE 2 1910 could be operating with the numerology B and the UE 3 1915 could be operating with the numerology C at the same time using SDM.

Figure 20:
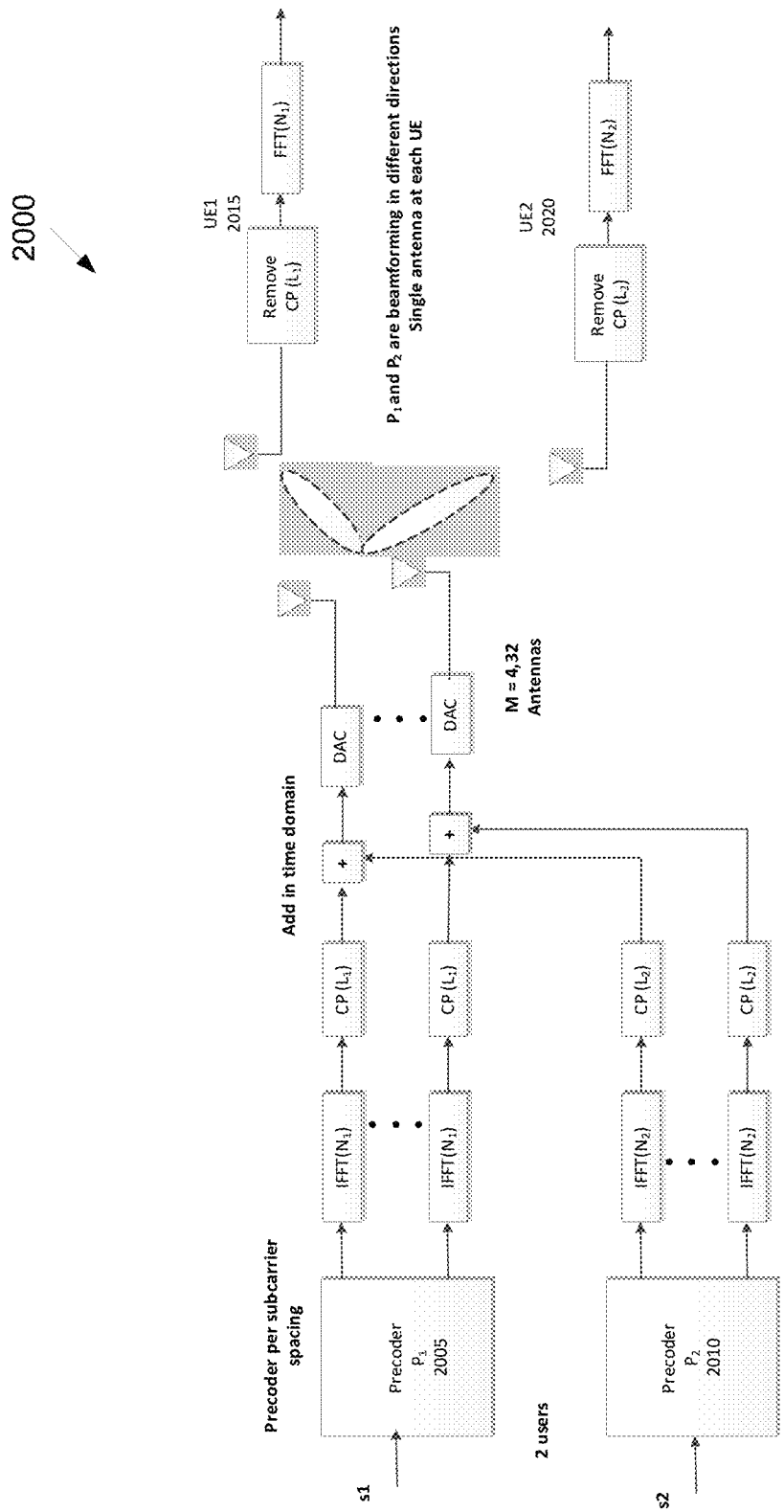
FIG. 20 illustrates a precoding in time and frequency domain according to embodiments of the present disclosure.

FIG. 20 2000 illustrates a precoding in time and frequency domain according to embodiments of the present disclosure. An embodiment of the precoding in time and frequency domain shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure. As shown in FIG. 20, the precoding in time and frequency domain 2000 comprises a precoder P1 2005, a precoder P2 2010, a UE 1 2015, and a UE 2 2020. As shown in FIG. 20, two users s1 and s2 are assumed with different sub-carrier spacing of 15 KHz and 30 KHz respectively.

Figure 21:
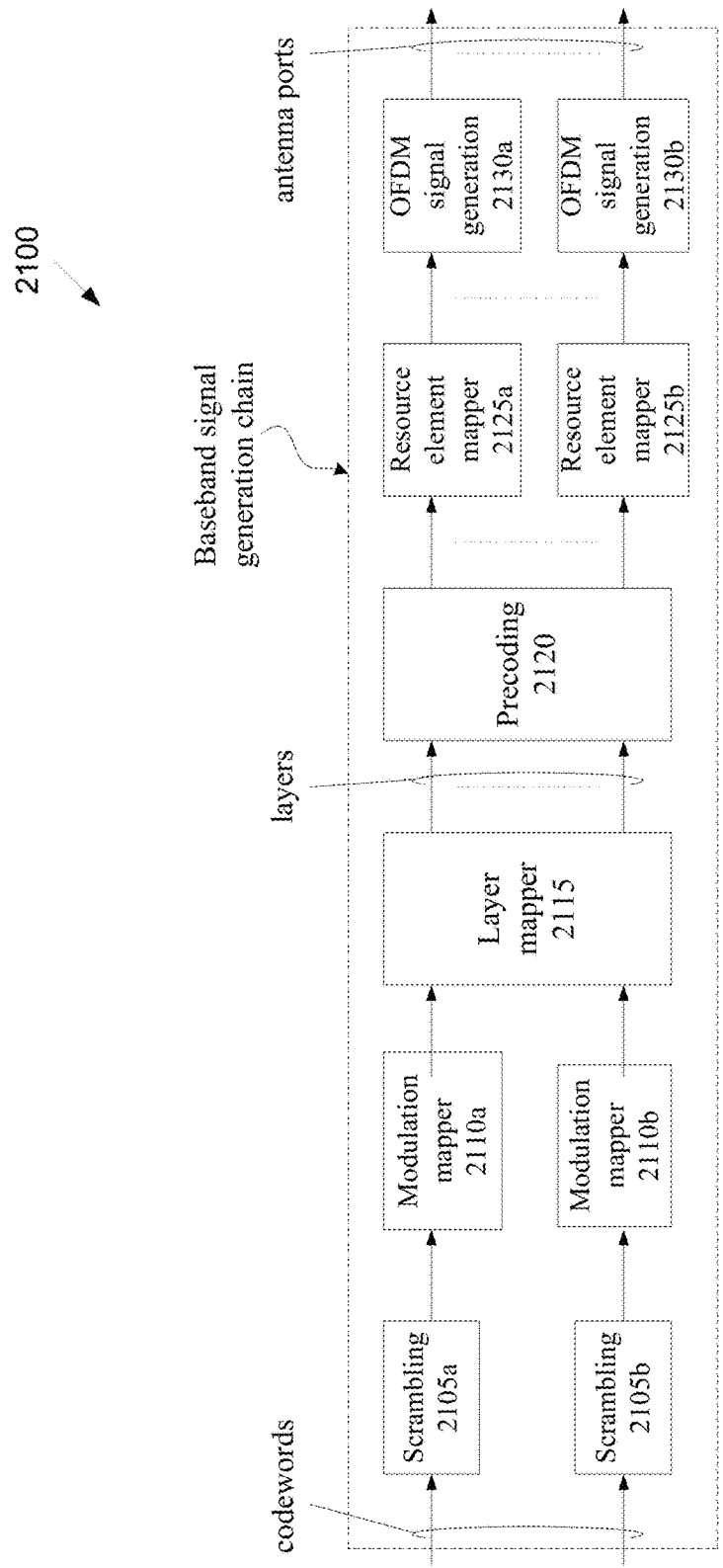
FIG. 21 illustrates structures of physical channels according to embodiments of the present disclosure.

FIG. 21 2100 illustrates structures of physical channels according to embodiments of the present disclosure, as may be applicable to more than one physical channels. An embodiment of the structure of physical channels shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure. As shown in FIG. 21, the structure of physical channels 2100 comprises a plurality of scramblings 2105a and 2105b, a plurality of modulation mappers 2110a and 2110b, a layer mapper 2115, a precoding 2120, a plurality of resource element mappers 2125a and 2125b, and a plurality of OFDM signal generation 2130a and 2130b.

The baseband signal representing a physical channel is defined to a based band signal generation chain. The codewords are scrambled at the plurality of scramblings 2105a and 2105b and each of the codewords is transmitted on a physical channel. The scrambled bits are modulated at the plurality of modulation mappers 2110a and 2110b to generate complex-valued modulation symbols. Mapping of the complex-valued modulation symbols are achieved at the layer mapper 2115 onto one or several transmission layers. Precoding of the complex-valued modulation symbols on each layer for transmission on the antenna ports are achieved at the precoding 2120. Mapping of complex-valued modulation symbols for each antenna port to resource elements are achieved at the plurality of resource element mappers 2125a and 2125b. Generation of complex-valued time-domain OFDM signal for each antenna port is achieved at the plurality of OFDM signal generations 2130a and 2130b.

Figure 22:
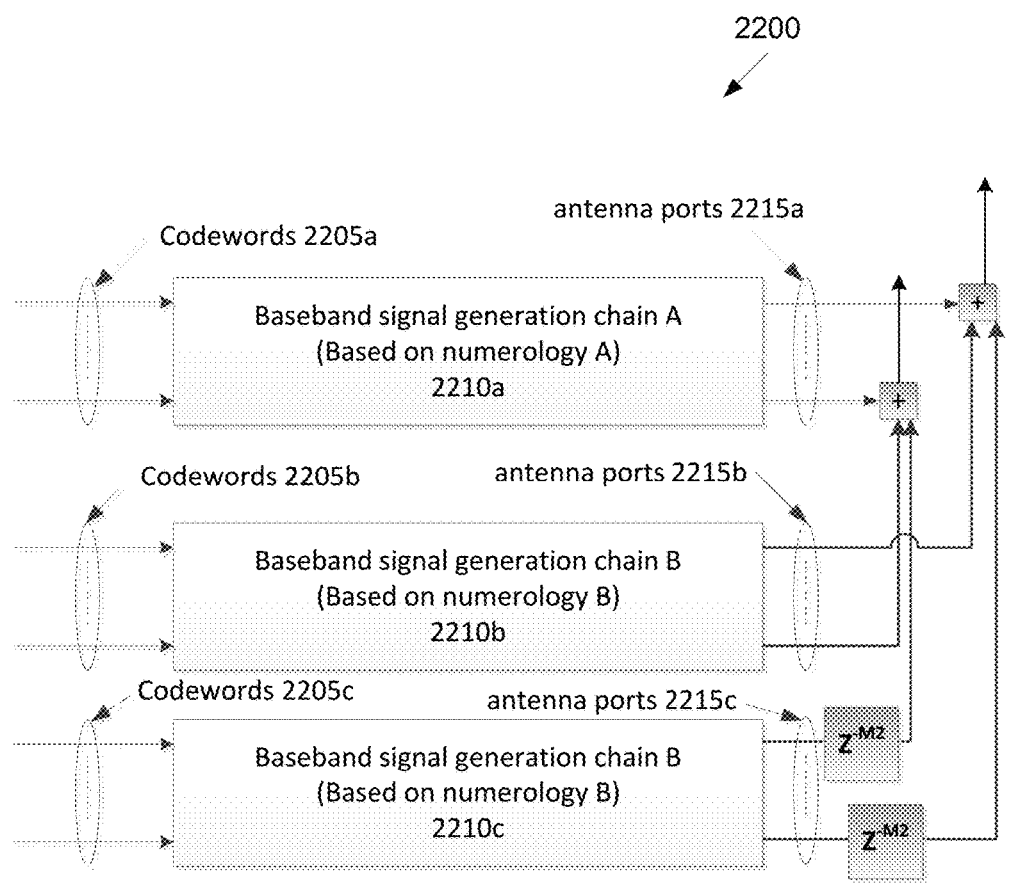
FIG. 22 illustrates a signal multiplexing with different numerologies according to embodiments of the present disclosure.

FIG. 22 2200 illustrates a signal multiplexing with different numerologies according to embodiments of the present disclosure. An embodiment of the signal multiplexing with different numerologies shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure. As shown in FIG. 22, the signal multiplexing with different numerologies 2200 comprises a plurality of codewords 2205a, 2205b, and 2205c, a baseband signal generation chain A (e.g., based on numerology A) 2210a, a baseband signal generation chain B (e.g., based on numerology A) 2210b, a baseband signal generation chain B (e.g., based on numerology B) 2210a, a plurality of antenna ports 2215a, 2215b, and 2215c.

When a device (eNB or UE) can generate signals with multiple numerologies, the device may comprise multiple baseband signal generation chains, one for each of numerologies. FIG. 22 illustrates a signal multiplexing with different numerologies.

The time-domain signals of length M1(=N1+L1) are generated for the configured antenna ports, based on numerology A from base signal generation chain A 2210a, with the multiple-codeword signals 2205a. The time-domain signals of length M2 (=N2+L2) are generated for the configured antenna ports, based on numerology B from base signal generation chain B 2210b, with the multiple-codeword signals 2205b.

The time-domain signals are combined in the baseband as illustrated in FIGS. 8 and 9. In one example, M1=2*M2. The M1 samples from chain A 2210a are combined with the two sets of M2 samples from chains B 2210b and 2210c, sample by sample from the first chain B 2210b to the second chain B 2210c. The delay operator $z^{-M2}$ is for illustrating the sample offset of M2 to combine the signals from the second chain B 2210b. However, the same output signals can be obtained with a single chain B with feeding two sets of inputs sequentially.

Figure 23:
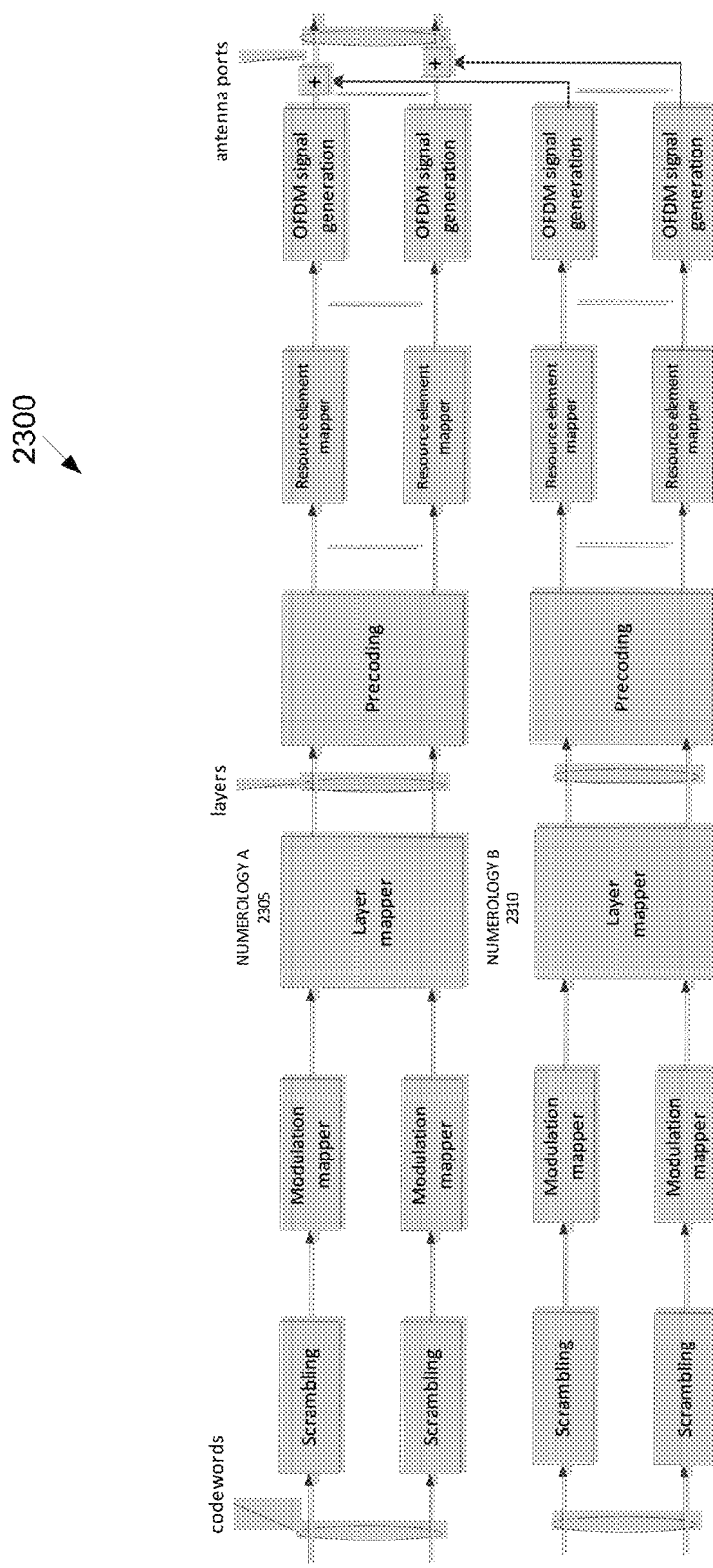
FIG. 23 illustrates a multiple numerology support with different numerologies according to embodiments of the present disclosure.

FIG. 23 2300 illustrates a multiple numerology support with different numerologies according to embodiments of the present disclosure. An embodiment of the multiple numerology support with different numerologies shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure. As shown in FIG. 23, the multiple numerology support with different numerologies 2300 comprises numerology A 2305 and a numerology B 2310.

In some embodiments, the multiple numerology support in TDM/FDM/SDM can be expressed by multiplexing the different numerologies as shown in FIG. 23. Two chains are shown in the example for two different numerologies A 2305 and B 2310. In case of TDM, only 1 chain is used at a given time. In case of FDM, both chains are used in different (or alternatively, orthogonal) frequency bands but are used in the same time. In case of SDM, both chains are used at the same (or alternatively, overlapped) time and frequency but are separated by precoding.

In some embodiments, the OFDM signal generation block in FIG. 23 comprises N-point IFFT and CP insertion of length L, wherein N and L are determined differently depending on the configured numerology.

Figure 24:
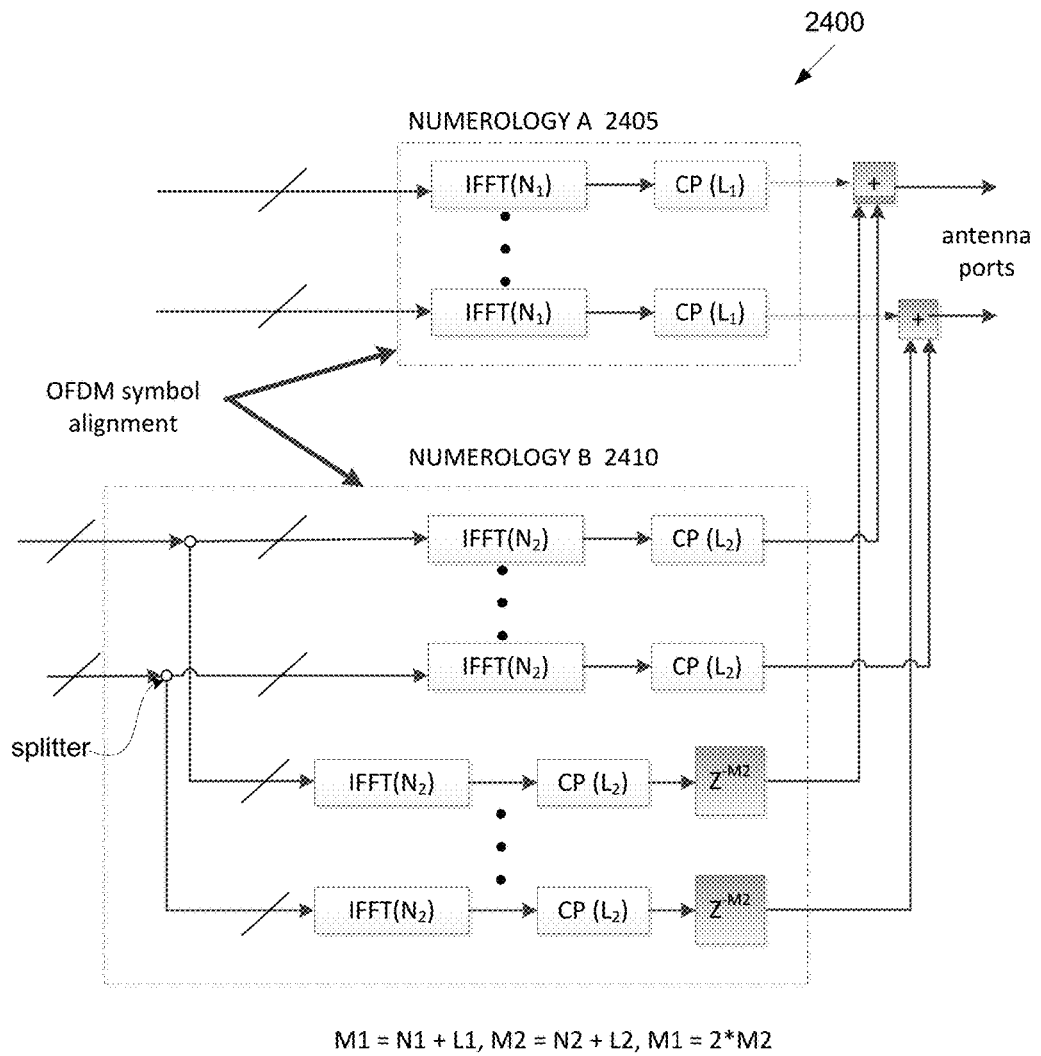
FIG. 24 illustrates an alignment of OFDM symbols generated with different numerologies according to embodiments of the present disclosure.

FIG. 24 2400 illustrates an alignment of OFDM symbols generated with different numerologies according to embodiments of the present disclosure. An embodiment of the alignment of OFDM symbols generated with different numerologies shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure. As shown in FIG. 24, the alignment of OFDM symbols generated with different numerologies 2400 comprises a numerology A 2405 and a numerology B 2410.

In some embodiments, although not a necessary condition, it can be beneficial if multiple symbols of a numerology are aligned with a single symbol of a different numerology to help align the frame structure between numerologies. The symbols with a "faster" numerology B 2410 are concatenated in the time domain while aligning to a single symbol of a "slower" numerology A 2405. In such embodiments, an OFDM symbol length of the "faster" numerology is shorter than that of "slower" numerology, and hence larger number of OFDM symbols can be allocated in a given time interval X. The concatenation is expressed by the delay operator "z". Note that the block diagram does not imply that additional FFTs are required in terms of hardware—they are just multiplexed in time.

Figure 25:
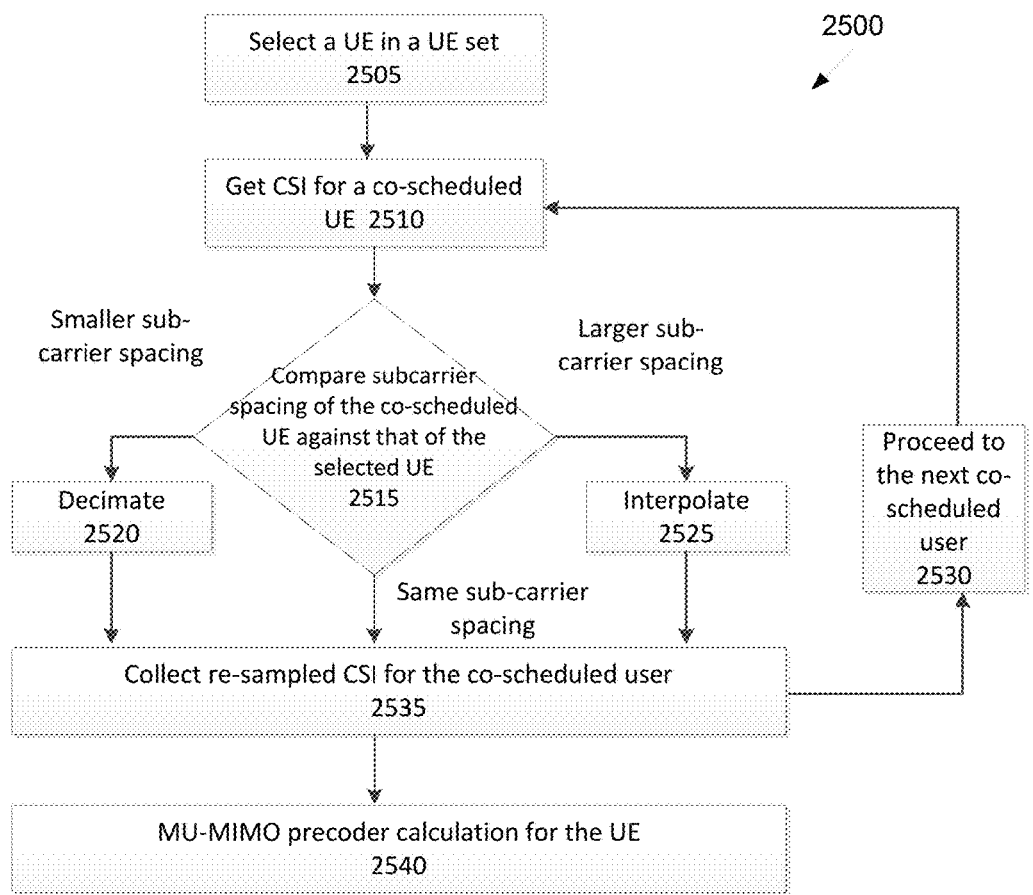
FIG. 25 illustrates an alignment of channel estimates across different numerologies according to embodiments of the present disclosure.

FIG. 25 2500 illustrates an alignment of channel estimates across different numerologies, as may be performed by an eNB, according to embodiments of the present disclosure. An embodiment of the alignment of channel estimates across different numerologies shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

FIG. 25 shows the alignment of channel estimates across different numerologies for the SLNR/MMSE precoder calculation for the current UE. The CSI (or channel coefficients in frequency domain) of each co-scheduled UE is interpolated, decimated or kept the same, depending on their numerology and then sent to the SLNR precoder calculation for the current user. At step 2505, the eNB selects a UE in a UE set. At step 2510, the eNB gets CSI from the UE for a co-scheduled UE. The eNB compares, at step 2515, sub-carrier spacing of the co-scheduled UE against that of the selected UE. At step 2515, if the subcarrier spacing of the co-scheduled UE is wider than that of the current UE (or the selected UE), the eNB performs interpolate at step 2525. For example, the CSI of the co-scheduled UE may be interpolated by an appropriate interpolation factor (preferably an integer) so that the same number of samples is obtained as that for the CSI of the current UE. At step 2515, if the subcarrier spacing of the co-scheduled UE is narrower than that of the current UE, the eNB performs decimates at step 2520. For example, the CSI of the co-scheduled UE may be decimated by an appropriate decimation factor (preferably an integer) so that the same number of samples are obtained as that for the CSI of the current UE. At step 2515, if the subcarrier spacing of the co-scheduled UE is the same as that of the current UE, the CSI of the co-scheduled UE can be used as it is. At step 2535, the eNB collects re-sampled CSI for the co-scheduled users each of which has the same number of samples. And then, the eNB calculates, at step 2540, the MU-MIMO precoder (e.g., based on MMSE or SLNR) for the current UE. At step 2530, the eNB proceeds to the next co-scheduled user based on the collected re-sampled CSI. This process is repeated for calculating the precoding weights of all the UEs in the user set for a time-frequency resource.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
    a transceiver configured to receive, from a base station (BS), downlink signals comprising at least one available set of transmission parameters using a multi-user multi-input multi-output (MU-MIMO), the MU-MIMO based on a re-sampled CSI of at least one co-scheduled UE in a UE set and a selected UE in the UE set;
    wherein the re-sampled CSI are based upon:
        selection of the selected UE to be scheduled from the UEs included in the UE set;
        comparison of subcarrier spacing of the selected UE with subcarrier spacing of at least one co-scheduled UE included in the UE set;
        interpolation of at least one subcarrier included in the set of transmission parameters that is allocated to the at least one co-scheduled UE using an interpolation factor when the subcarrier spacing of the at least one co-scheduled UE is wider than subcarrier spacing of the selected UE; and
        decimation of at least one subcarrier included in the set of transmission parameters that is allocated to the at least one co-scheduled UE using a decimation factor when the subcarrier spacing of the at least one co-scheduled UE is narrower than the subcarrier spacing of the selected UE; and
    at least one processor configured to determine at least one preferred set of transmission parameters including a subcarriers spacing based on the received downlink signals, wherein the transceiver is further configured to transmit a report message including the at least one preferred set of transmission parameters.

2. The UE of claim 1, wherein the at least one processor is further configured to:
    remove a cyclic prefix (i) of the received downlink signals in a time domain; and convert the CP removed downlink signals to frequency domain signals using a plurality of fast Fourier transforms (FFTs).

3. The UE of claim 1, wherein the transceiver is further configured to:
receive the downlink signals comprising a set of transmission parameters using the MU-MIMO; and
transmit the report message including channel state information (CSI) based on the received downlink signals.

4. The UE of claim 1, wherein the transceiver is further configured to:
receive the downlink signals in at least one of multiplexing modes including a time division multiplexing (TDM) mode, a frequency division multiplexing (i) mode, or a space division multiplexing (SDM) mode in a same frequency band, the downlink signals comprising reference symbols located in different positions in the downlink signals; and
transmit the report message using uplink signals based on the received downlink signals in at least one of multiplexing modes including a time division multiplexing (TDM) mode, a frequency division multiplexing (FDM) mode, or a space division multiplexing (SDM) mode in the same frequency band.

5. A base station (BS) in a wireless communication system, the BS comprising:
at least one processor configured to:
identify a set of transmission parameters comprising a numerology, wherein the numerology includes a subcarrier spacing;
determine a plurality of baseband signal generation chains each of which includes the set of transmission parameters comprising different numerology;
select a UE to be scheduled from UEs included in a plurality of groups;
compare the subcarrier spacing of the selected UE with subcarrier spacing of at least one UE included in the plurality of groups;
interpolate at least one subcarrier included in the set of transmission parameters that is allocated to the at least one UE using an interpolation factor when the subcarrier spacing of the at least one UE is wider than subcarrier spacing of the selected UE; and
decimate at least one subcarrier included in the set of transmission parameters that is allocated to the at least one UE using a decimation factor when the subcarrier spacing of the at least one UE is narrower than the subcarrier spacing of the selected UE; and
a transceiver configured to transmit, to at least one user equipment (UE), downlink signals comprising the set of transmission parameters using a multi-user multi-input multi-output (MU-MIMO).

6. The BS of claim 5, wherein:
the at least one processor is further configured to multiplex output signals from the plurality of baseband signal generation chains each of which includes the set of transmission parameters comprising the different numerology; and
the transceiver is further configured to transmit the downlink signals comprising the multiplexed output signals through a plurality of antenna ports using the MU-MIMO.

7. The BS of claim 5, wherein the at least one processor is further configured to:
determine a plurality of precoders each of which includes the set of transmission parameters comprising the different numerology, the plurality of precoders being included the plurality baseband signal generation chains;
convert output signals from each of the plurality of precoders to time domain signals using a plurality of inverse fast Fourier transforms (IFFTs); and
add a cyclic prefix (CP) to each of the time domain signals that is outputted from each of the plurality of precoders, wherein the time domain signals outputted from different precoders include different CP lengths.

8. The BS of claim 5, wherein:
the at least one processor is further configured to determine a plurality of groups comprising the at least one UE; and
the transceiver is further configured to receive a report message from the at least one UE included in the plurality of groups.

9. The BS of claim 5, wherein the at least one processor is further configured to
maintain the set of transmission parameters that is allocated to the at least one UE when the subcarrier spacing of the at least one UE is equal to the subcarrier spacing of the selected UE.

10. The BS of claim 5, wherein:
the at least one processor is further configured to determine at least one available set of transmission parameters including the subcarriers spacing; and
the transceiver is further configured to:
broadcast, to the at least one UE, the downlink signals comprising the at least one available set of transmission parameters using the MU-MIMO; and
receive a response message including at least one preferred set of transmission parameters from the at least one UE.

11. The BS of claim 5, wherein the transceiver is further configured to:
transmit the downlink signals in at least one of multiplexing modes including a time division multiplexing (TDM) mode, a frequency division multiplexing (FDM) mode, or a space division multiplexing (SDM) mode in a same frequency band, the downlink signal comprising reference symbols located in different positions in the downlink signals; and
receive a report message using uplink signals based on the transmitted downlink signals in at least one of multiplexing modes including a time division multiplexing (TDM) mode, a frequency division multiplexing (FDM) mode, or a space division multiplexing (SDM) mode in the same frequency band.

12. A method of operating a base station (BS) in a wireless communication system, the method comprising:
identifying a set of transmission parameters comprising a numerology, wherein the numerology includes a subcarrier spacing;
determining a plurality of baseband signal generation chains each of which includes the set of transmission parameters comprising different numerology;
selecting a UE to be scheduled from UEs included in a plurality of groups;
comparing the subcarrier spacing of the selected UE with subcarrier spacing of at least one UE included in the plurality of groups;
interpolating at least one subcarrier included in the set of transmission parameters that is allocated to the at least one UE using an interpolation factor when the subcarrier spacing of the at least one UE is wider than subcarrier spacing of the selected UE;

decimating at least one subcarrier included in the set of transmission parameters that is allocated to the at least one UE using a decimation factor when the subcarrier spacing of the at least one UE is narrower than the subcarrier spacing of the selected UE; and transmitting, at least one user equipment (UE), downlink signals comprising the set of transmission parameters using a multi-user multi-input multi-output (MU-MIMO).

13. The method of claim 12, further comprising:

multiplexing output signals from the plurality of baseband signal generation chains each of which includes the set of transmission parameters comprising the different numerology; and transmitting the downlink signals comprising the multiplexed output signals through a plurality of antenna ports using the MU-MIMO.

14. The method of claim 12, further comprising:

determining a plurality of precoders each of which includes the set of transmission parameters comprising the different numerology, the plurality of precoders being included the plurality of baseband signal generation chains;

converting output signals from each of the plurality of precoders to time domain signals using a plurality of inverse fast Fourier transforms (IFFTs); and adding a cyclic prefix (CP) to each of the time domain signals that is outputted from each of the plurality of precoders, wherein the time domain signals outputted from different precoders include different CP lengths.

15. The method of claim 12, further comprising:

determining a plurality of groups comprising the at least one UE; and receiving a report message from the at least one UE included in the plurality of groups.

16. The method of claim 12, further comprising:

maintaining the set of transmission parameters that is allocated to the at least one UE when the subcarrier spacing of the at least one UE is equal to subcarrier spacing of the selected UE.

17. The method of claim 12, further comprising:

determining at least one available set of transmission parameters including the subcarriers spacing;

broadcasting the downlink signals comprising the at least one available set of transmission parameters using the MU-MIMO; and receiving a response message including at least one preferred set of transmission parameters from the at least one UE.

18. The method of claim 12, further comprising:

transmitting the downlink signals in at least one of multiplexing modes including a time division multiplexing (TDM) mode, a frequency division multiplexing (FDM) mode, or a space division multiplexing (SDM) mode in a same frequency band, the downlink signal comprising reference symbols located in different positions in the downlink signals; and receiving a report message using uplink signals based on the transmitted downlink signals in at least one of multiplexing modes including a time division multiplexing (TDM) mode, a frequency division multiplexing (FDM) mode, or a space division multiplexing (SDM) mode in the same frequency band.

* * * * *